United States Patent [19]

Brockman et al.

[11] 4,055,148
[45] Oct. 25, 1977

[54] ANIMAL HOLDING CLAMP APPARATUS

[75] Inventors: Arnold Brockman, Humboldt; Norbert Beaujot, Saskatoon, both of Canada

[73] Assignee: Brockman's Service Ltd., Humbodt, Canada

[21] Appl. No.: 625,531

[22] Filed: Oct. 24, 1975

[30] Foreign Application Priority Data

Oct. 28, 1974 Canada .................................. 212399

[51] Int. Cl.² ............................................. A01K 15/00
[52] U.S. Cl. ......................................... 119/103; 49/98
[58] Field of Search ................... 119/103, 98, 99, 100; 269/322, 328, 34, 20, 25, 265–268, 142, 147–149, 321 LV; 17/1 A, 44.3; 214/652–658, 651, 660; 294/67 B, 67 BB, 103 R; 254/93 R, 93 VA, 93 HP

[56] References Cited

U.S. PATENT DOCUMENTS

| | | | |
|---|---|---|---|
| 2,545,021 | 3/1951 | Coupland et al. ................... | 214/654 |
| 3,051,984 | 9/1962 | Hlavacek et al. ..................... | 17/1 A |
| 3,250,251 | 5/1966 | Geary ................................... | 119/98 |
| 3,319,608 | 5/1967 | Klooster ............................... | 17/1 A |
| 3,590,784 | 7/1971 | Fly ....................................... | 119/103 |

Primary Examiner—Louis G. Mancene
Assistant Examiner—Peter K. Skiff
Attorney, Agent, or Firm—Lawrence E. Laubscher

[57] ABSTRACT

A versatile animal-immobilizing chute or cage structure is an integral vise framework having open ends and no bottom, comprised as a fixed side wall unitary with a top wall, and a movable opposed side wall, the movable wall comprising five or six longitudinally spaced upright frame columns each slidable along a top wall member toward or away from a corresponding fixed member by individual linear hydraulic motors, to grip the sides of an animal body between the vise walls. The vise inner surfaces are comprised of cushion bodies having friction casings fitted over inflatable bags or bladders that may be distended by pneumatic pressure, mounted on swivelling plates to conform to animal surfaces engaged. Other bags or bladders are mounted on lower end plates in pairs to engage a leg of the standing animal between them by longitudinal distention, two pairs holding the forelegs and another two pairs the hind legs; moving upright frames fold outwardly to give access to a body area and are latchable in straight aligned position. The vise framework is inclinable by an offset floor-mounted linear motor joined with the rigid side wall and may be raised or lowered by a pair of end-mounted upright linear motors. Portable versions carrying their hydraulic and pneumatic power units may be lifted by a gantry crane or by a helicopter, or a field unit may be a mobile trailer unit, self-contained and adapted for dismounting. Animals are siezed when walking through the open vise; tranquilized or ill animals are loaded by slings actuated by folding of frame members with the rigid side wall laid flat.

23 Claims, 23 Drawing Figures

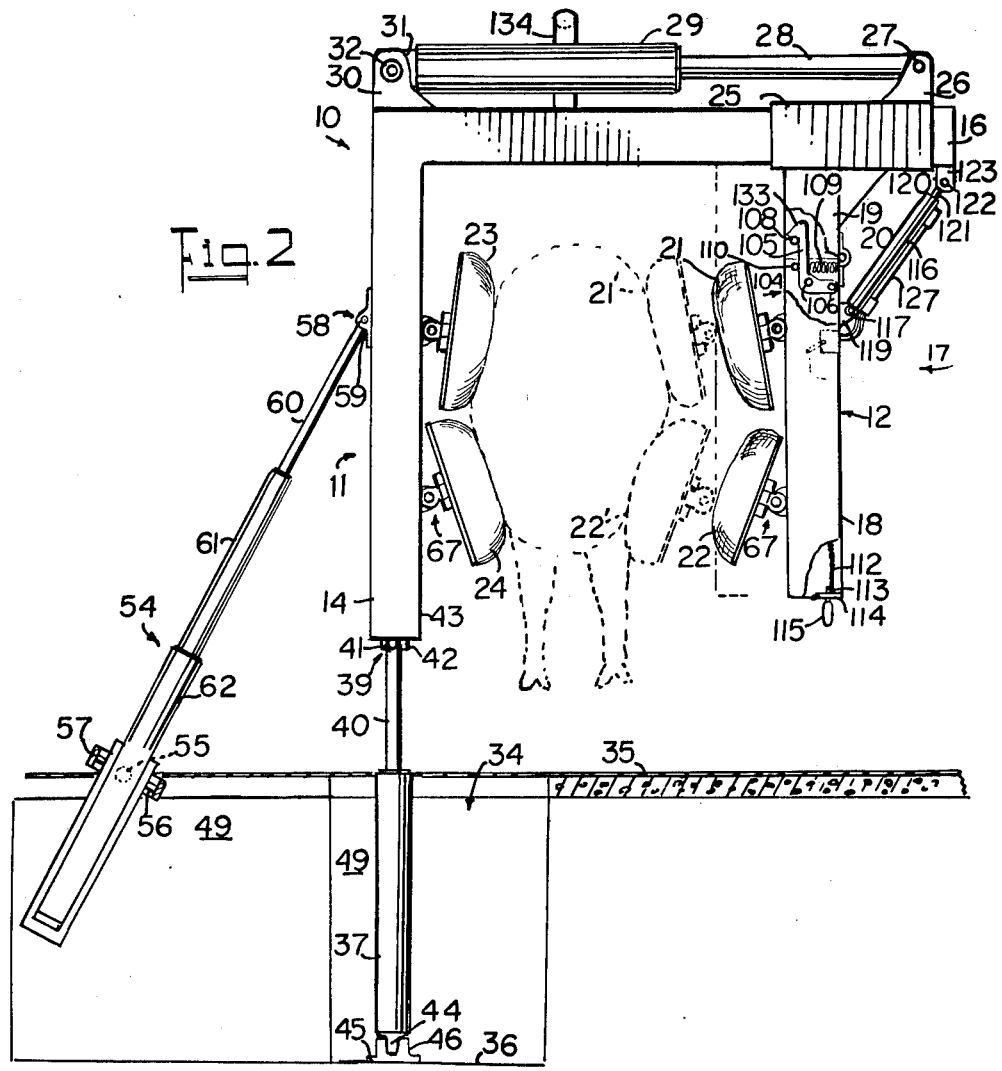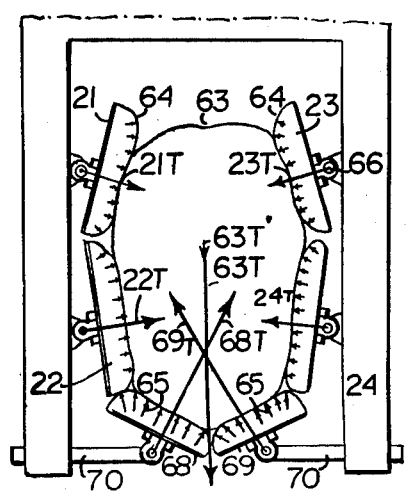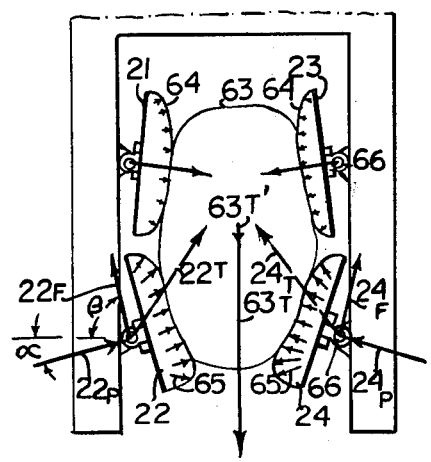

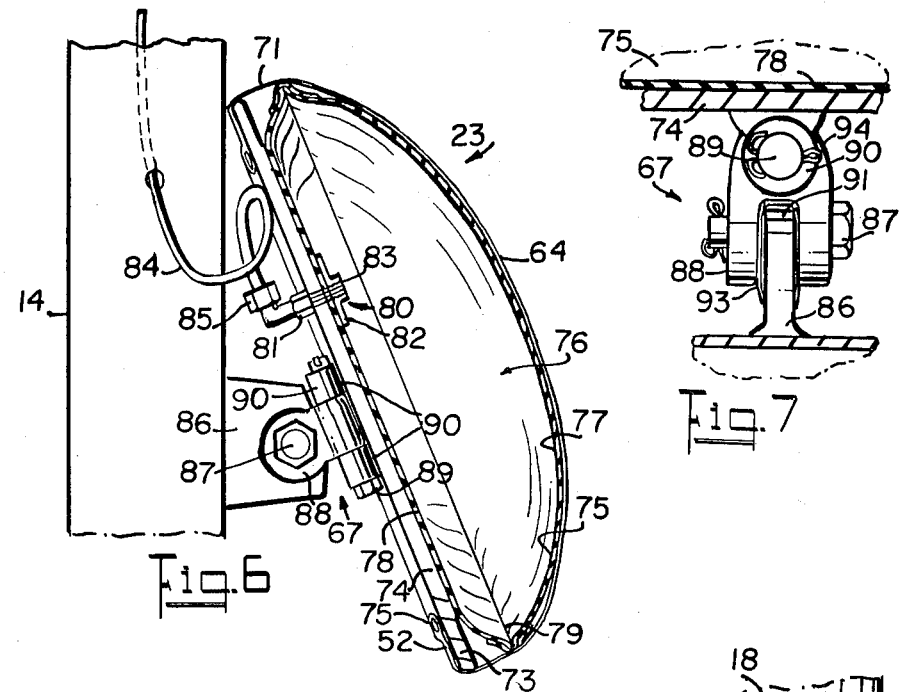
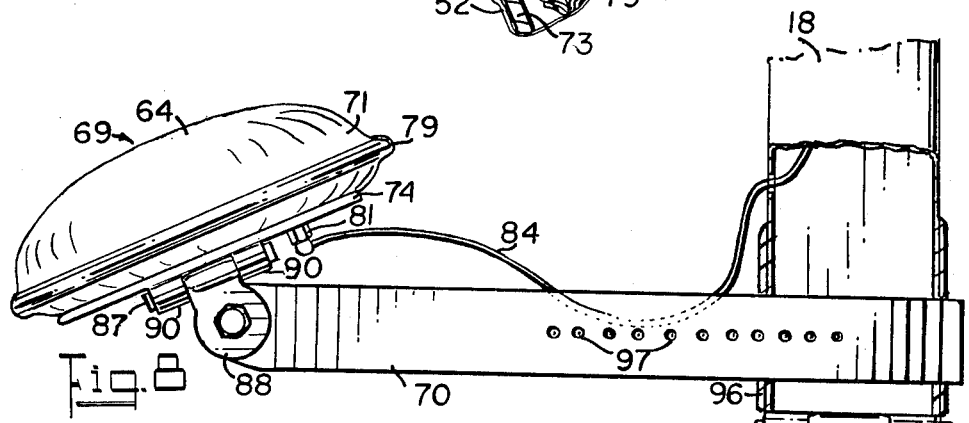
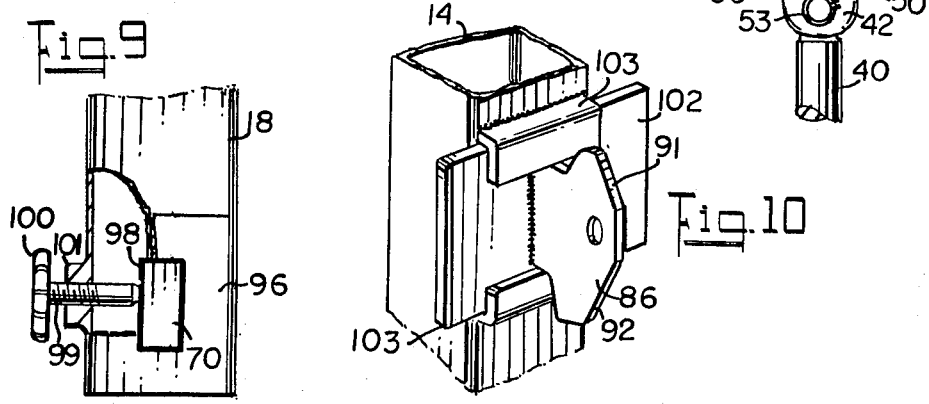

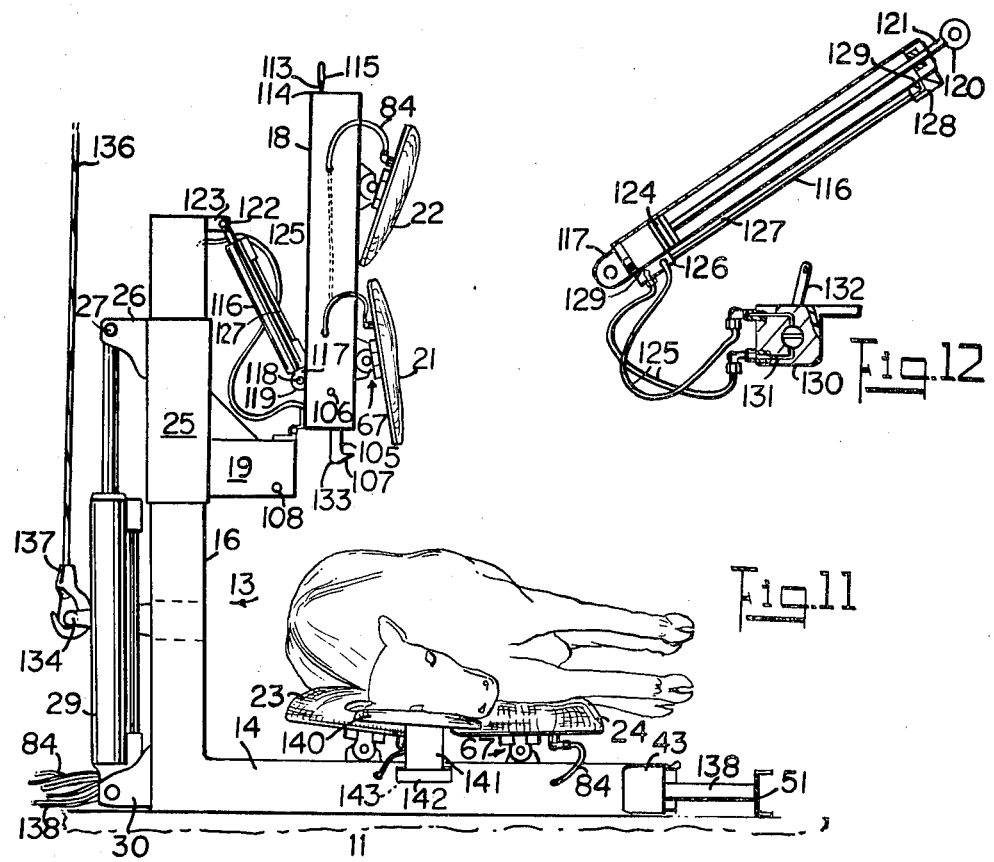
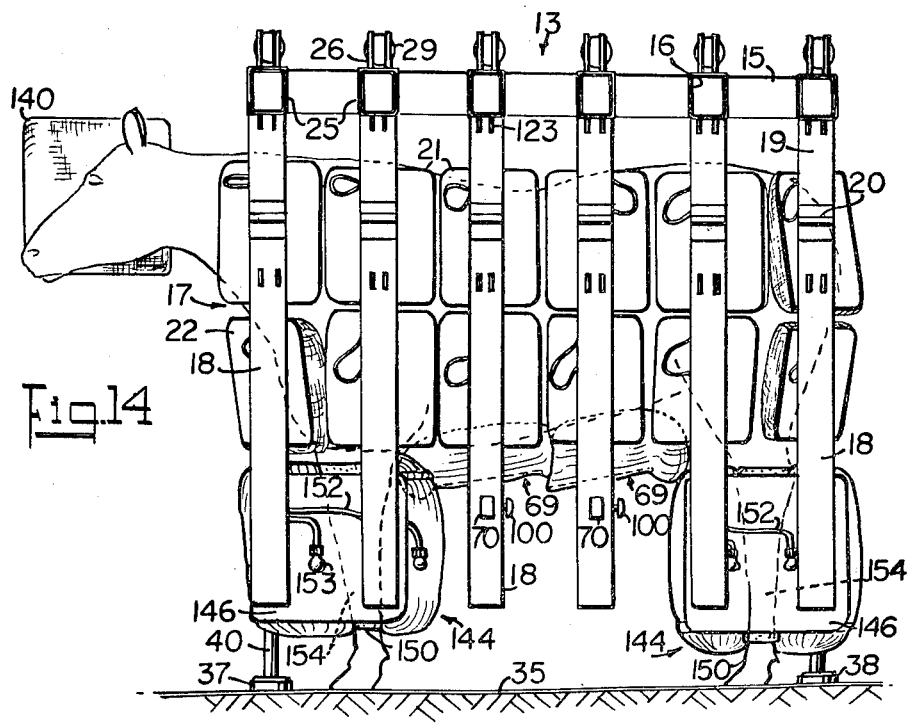

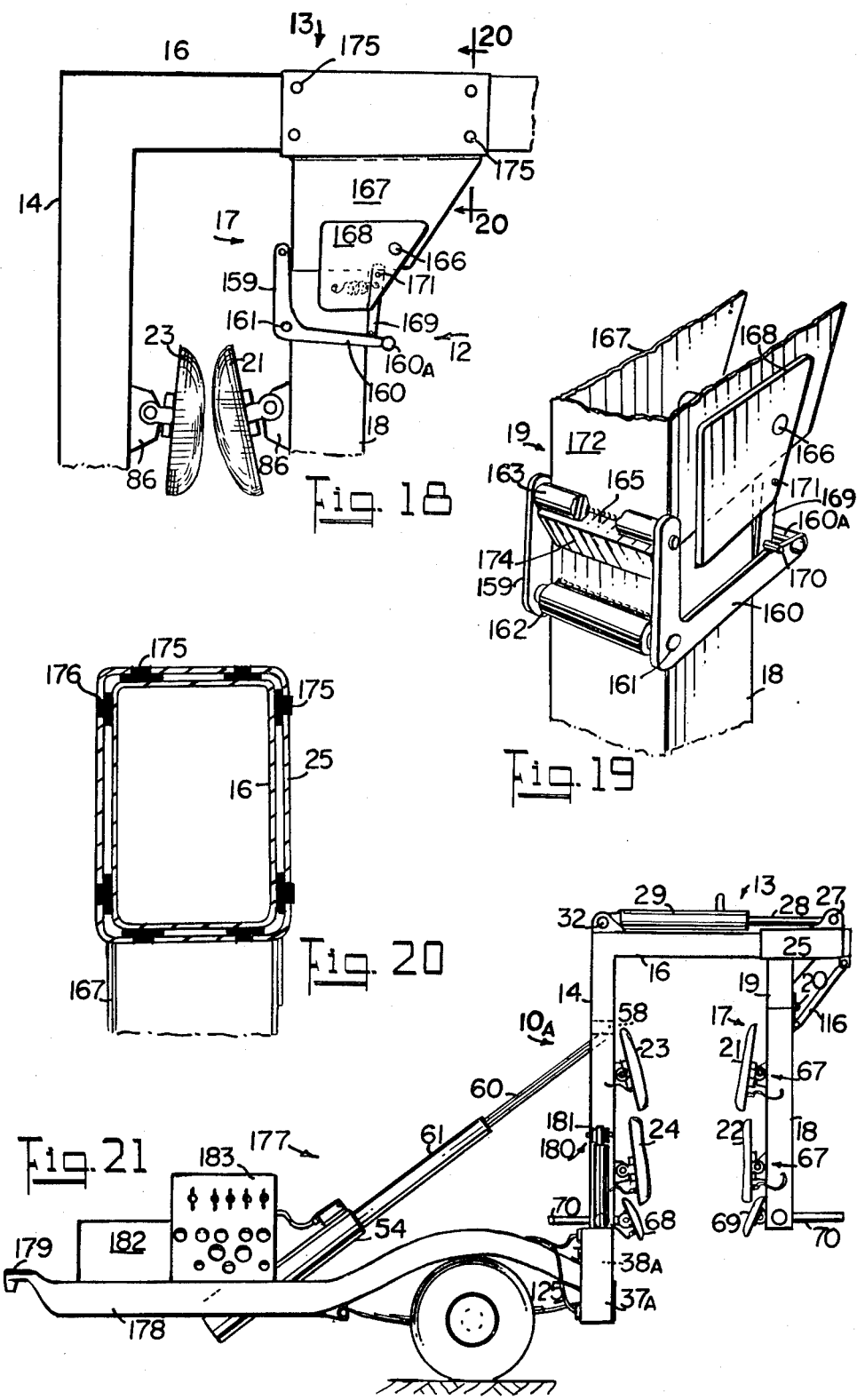

ANIMAL HOLDING CLAMP APPARATUS

DESCRIPTION OF THE INVENTION

This invention relates to apparatus for safely handling and treating animals, and more particularly concerns apparatus in the nature of a powered clamp or vise structure for confining an animal between cushioned clamping surfaces of large area by which the animal is not only held immobilized but is also comfortably supported while being oriented in any desired body position.

The invention extends also to ancillary apparatus for positioning an immobilized animal in any desired attitude for examination, treatment or surgical procedure of any selected side or belly area.

The invention is particularly intended to provide a versatile system of handling apparatus incorporating a powered clamp or vise unit having pneumatically and hydraulically actuated sidewalls for clampedly engaging and releasing the sides of an animal by yielding clamp surfaces applying pressure over substantially its entire side-elevational body areas. Such clamp or vise unit is effective to immobilize and support even a large animal such as stallion or bull yet exerts very low unit area clamping pressures. Apparatus according to the invention, when associated with ancillary elevating and positioning apparatus and limb-restraint devices is capable of providing gentle, safe holding and positioning of domesticated animals such as swine, goats, sheep, cattle and horses requiring examination or any sort of operation, as well as wild or captive quadrupeds of a similar range of sizes.

Heretofore a number of animal holding structures have been proposed in the prior art for restraining and supporting live animals either by squeezing the sides of the animal between frames forming the sides of a box-like passage, or by passing bands about the animal's body while it stands alongside a vertically oriented pivoting table, then lifting the animal while strapped to the table by turning the table into the horizontal. Examples of such structures are described in U.S. Pat. No. 3,520,529 issued to Obel and in U.S. Pat. No. 3,633,901 issued to Lindquist.

Such primitive devices as those disclosed in the aforesaid publications inevitably subject the animal to the risk of mental and physical trauma, and expose the operator to the difficulties of leading and/or driving the animal into position, in passing straps or bands about the animal, and in sufficiently confining and immobilizing the alarmed animal while its feet still bear on the floor and it attempts to break free.

The apparatus of the present invention has been conceived as a result of experience with the difficulties, danger and stressful conditions inherent in confining animals by means of prior art cage and table systems. The novel apparatus has been devised with the primary objective of simultaneously ensuring the maximum safety to the animal and human operator in the procedure of immobilizing and supporting an animal, as well as a minimum of mental anxiety and physical stress or discomfort to the animal.

The essential condition for animal safety to be met is that prior to its complete immobilization, while the animal may still exert thrust forces in any direction permitted by its musculature and experience, the surfaces presented by the immobilizing structure require to be yielding and effective to gently absorb the energy of the animal even as it violently hurls its body to either side, forwardly, or upwardly. Moreover as the animal is led or urged into position for engagement by the immobilizing structure, its immediate surroundings should not appear hazardous or alarming, and so elicit the urge to escape; for example the path forward of the animal should be without any obstruction, such as any floor obstacle or threshold; neither should any cage framework or barrier to the animals's forward progress be perceptible as the animal moves ahead. As a further essential, in recognition of the ability of the animal to kick strongly whether its body is subjected to lateral and upward clamping pressures or not, effective and safe gripping of the lower portions of the hind legs by fast-acting leg-hold devices that may be quickly rendered immovable is a prerequisite to complete immobilization. It has been found that the greatest likelihood of self-injury by the animal arises when it makes frantic pawing movements by the forelegs and kicking thrusts by the hind legs, consequently in confining longer-legged animals such as horses, gentle yet rapid and total restraint of the cannon close to the fetlock, and restraint of equivalent foreleg portions, is necessary.

As a further and very important condition for the safety of an animal, once it is confined and held immobile, the weight of the animal's body still supported on its feet should be either markedly decreased or reduced to zero inherently by the action of the clamp or vise unit, which should apply a sufficient lifting component as clamping pressure is exerted upwardly against the downwardly-convex surfaces to tend to elevate the animal clear of the floor. It has been found that not only is the ability of the animal to exert reaction forces by its hooves minimised or entirely obviated by such lifting effect, but the transition sensed by the animal from a ground-supported to a "floating" state is perceived as a wholly novel yet not uncomfortable condition, distracting its alarm response. The reaction to the state of being wholly immobilized and gently supported along their entire body sides from neck to tail in the great majority of animals is passivity, and most animals appear to be soon at ease.

It is especially important that in contrast to prior cageframe corridor structures which compress the animal's sides between steel frameworks, the applied clamping pressures should at no point exceed the skin pressures experienced by the animal in the course of its usual reclining or rolling-over movements, so that even while being confined for long periods in the clamp apparatus the pressure remains agreeable and soothing to the immobilizing animal. In the standing position only very low unit pressures need be applied for achieving immobilization, for instance pressures as low as a few grams per square centimeter over the upper side surfaces of the animal, while pressures exerted upon the lower or under sides of the animal body usually need not exceed the range of 10 to 40 grams per square centimeter to hold the animal clear of the ground. In horizontally recumbent position, the unit pressures exerted against the supported side of the animal will be generally under 40 grams per square centimeter.

STATEMENT OF THE INVENTION

According to the invention, animal-immobilizing clamp apparatus is provided which essentially comprises a unitary threesided structure having one side wall formed as a rigid planar framework integral with a top wall and carrying a plurality of plates on which are mounted pneumatic cushion bodies, and an opposed side wall comprising a series of longitudinally-spaced individually-movable beam members each carrying plates on which are mounted pneumatic cushion bodies, the yielding surfaces of opposed plate groups being presented toward the animal sides and each group spanning substantially the length and height of the sides of the animal; the beam members are arranged for powered rectilinear movement toward and away from the plane of the rigid framework, enabling an animal to pass between or to be confined between the yielding surfaces of the side walls and to be immobilized by controlled inward movement of the beam members combined with controlled inflation of selected cushion bodies; each movable beam member is foldable outwardly about a hinge axis such that the major length portion of the beam member may be displaced entirely clear of the side of an animal for giving access to a specific body area without disturbing any other beam member; the apparatus further comprises integral connecting elements providing means for suspending and for supporting the clamp apparatus, specifically an eye or ring fixed in the top wall for pendulously supporting the apparatus thereby, and articulated joint elements carried by the rigid framework permitting connection with linear motor elements fixed to a reference framework or structure for elevating the apparatus and for inclining the apparatus about longitudinal and transverse axes.

The invention also extends to animal-immobilizing clamp apparatus as recited having arrangements for mounting animal-engaging cushioned plates for universal swivelling with respect to their supporting framework or beam member, permitting the plane of the plate to be self-oriented in generally tangential relation with the portion of the animal's side in contact therewith.

The invention also extends to clamp apparatus as recited having plate-swivelling support elements arranged with limit stop elements for restricting the inclination of a plate with respect to a normal to the plane of the rigid framework, and limit stop elements associated with a lowermost tier of cushioned plates arranged to cooperate with eccentrically-mounted plates to automatically select a cushion body inclination such that a more nearly tangential engagement position is obtained with the underside of the animal body.

The invention additionally extends to clamp apparatus as recited having plate-swivelling support mounting elements arranged to permit limited longitudinal adjustment of the plate in the mounting.

GENERAL EXPRESSION OF THE INVENTION BY STRUCTURE

In carrying the invention into effect, animal immobilizing clamp apparatus is realized as a three-sided clamp or vise unit constructed from metal structural members such as tubing of rectangular, round, or oval section, or of open sectional forms such as channels, "T" or "I" sections; the rigid planar framework of one side wall comprises a series of spaced upright structural members integrally joined as by welding with longitudinal beam members; the top wall comprises integral transverse beam members having their one ends joined with the top ends of the spaced upright structural members, and the movable beam members comprising cantilever elements including individual sleeve or equivalent guide elements carried by an upper end of the movable beam member and being slidably guidedly movable by powered motor means mounted in the top wall along a transverse beam member to maintain the movable beam member parallel with the rigid framework. The clamp apparatus is designed and arranged so that when an animal is immobilized therein, the structure and the animal may be raised as one either by suspending the structure from a single eye fixed in the top wall or by actuating at least three hydraulic piston-and-cyoinder lifting motor means connected to the rigid framework and to a reference structure, of which two motor means are connected at longitudinally spaced lower positions and the third motor means is connected at an upper position. The structure may be inclined by selectively actuating one or more of the hydraulic motor means.

In animal-engaging cushion bodies and their mounting on supportingplates, distensible elastomeric bags of flat pillow form are secured upon front faces of rigid metal plates by enclosing fabric covers having marginal portions engaged about plate margins and enveloping rearward surface portions of the plates, the covers permitting limited outward distention and limited lateral displacement of the surfaces of the cushion body in a direction parallel with the plate surface.

Certain ones of the cushion bodies are preferably simple elastomeric envelopes capable of expansion without fabric restraint, as under-belly lifting cushion bodies, and contoured leg-hold cushion bodies.

DETAILED DESCRIPTION OF SPECIFIC EMBODIMENTS

The invention will be more fully described in and by the detailed discussion of its preferred embodiments, in conjunction with the accompanying figures of drawing, wherein:

FIG. 2 is an end elevational view showing the apparatus of FIG. 1 in raised position and also showing by phantom outline the relationship of an animal to supporting cushion bodies;

FIG. 3 is a vector diagram showing forces exerted on surfaces of the animal body by apparatus of FIG. 2;

FIG. 4 is a vector diagram similar to FIG. 3 showing immobilizing and support forces for three tiers of cushion bodies;

FIG. 6 is an elevation diagram in enlarged scale showing mounting for a support plate and attachment of a cushion body, shown in section;

FIG. 7 is a detail in plan showing the plate mounting of FIG. 6;

FIG. 8 is an end elevation view partly cut away showing a transversely movable mounting for a lifting cushion body;

FIG. 9 is an end elevational view of a column showing a securing arrangement for the mounting of FIG. 8;

FIG. 10 is a perspective diagram showing longitudinally movable plate mounting means;

FIG. 11 is an end elevational view showing the clamp apparatus of FIG. 1 laid on the ground, with all moving columns swung into raised positions;

FIG. 12 is a sectional diagram in enlarged scale showing a link and control therefor;

FIG. 14 is a side elevational view of a clamp apparatus for large animals showing additional lifting cushion bodies and pneumatic leg-holds;

FIG. 18 is a partial end elevational view showing an alternative arrangement for swinging a column; and also showing latch locking elements;

FIG. 19 is a perspective view showing the and latching elements of the structures of FIG. 18;

FIG. 20 is a sectional view taken on line 20—20 of FIG. 18 showing anti-friction button elements in a slide element;

FIG. 21 is a side elevational view of a transportable trailer vehicle into which the clamp apparatus of FIG. 1 is mounted with control and power equipment;

Figure 23:
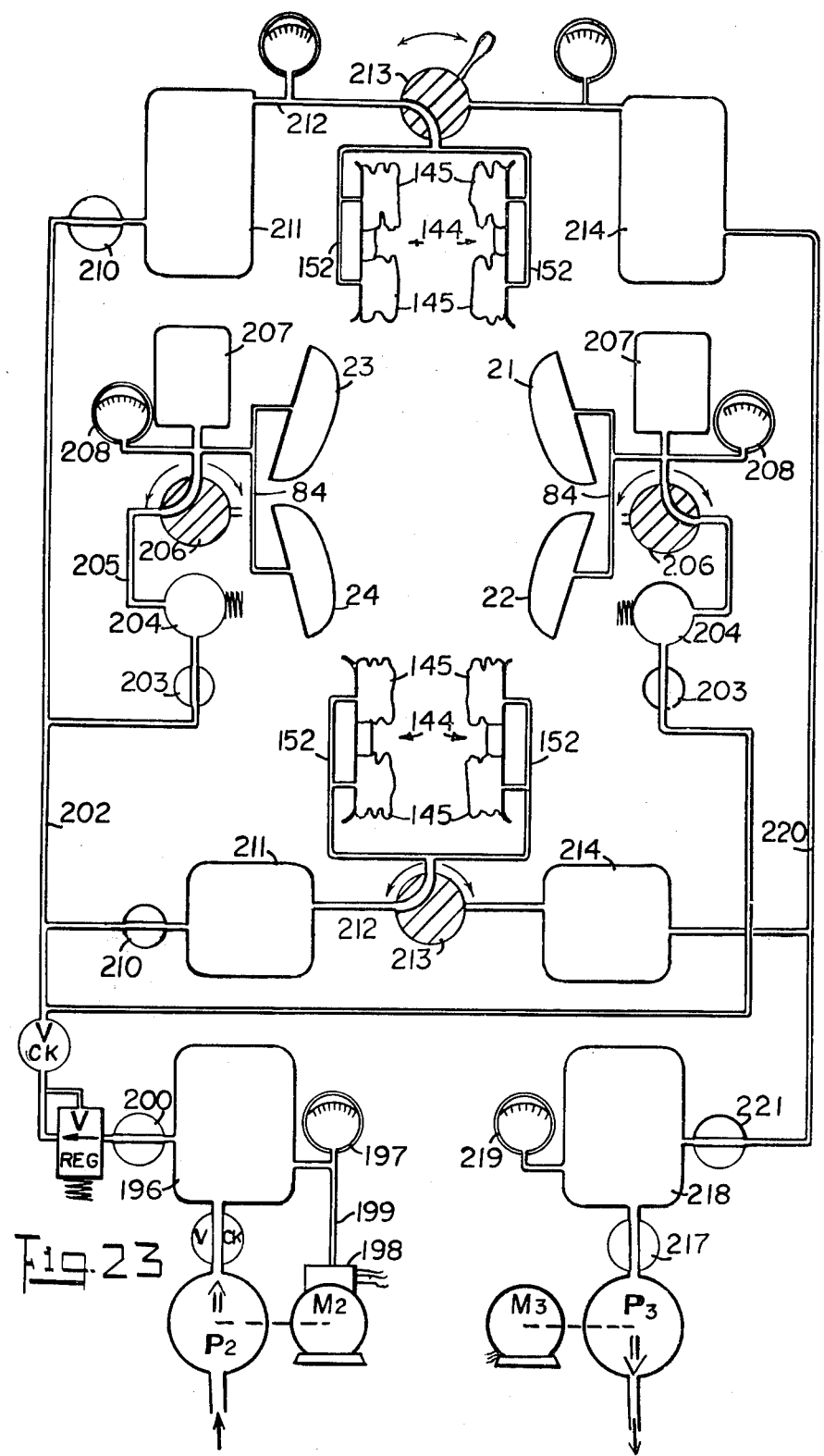

and FIG. 23 is a schematic diagram showing control and power circuits operating as pneumatic systems.

Figure 1:
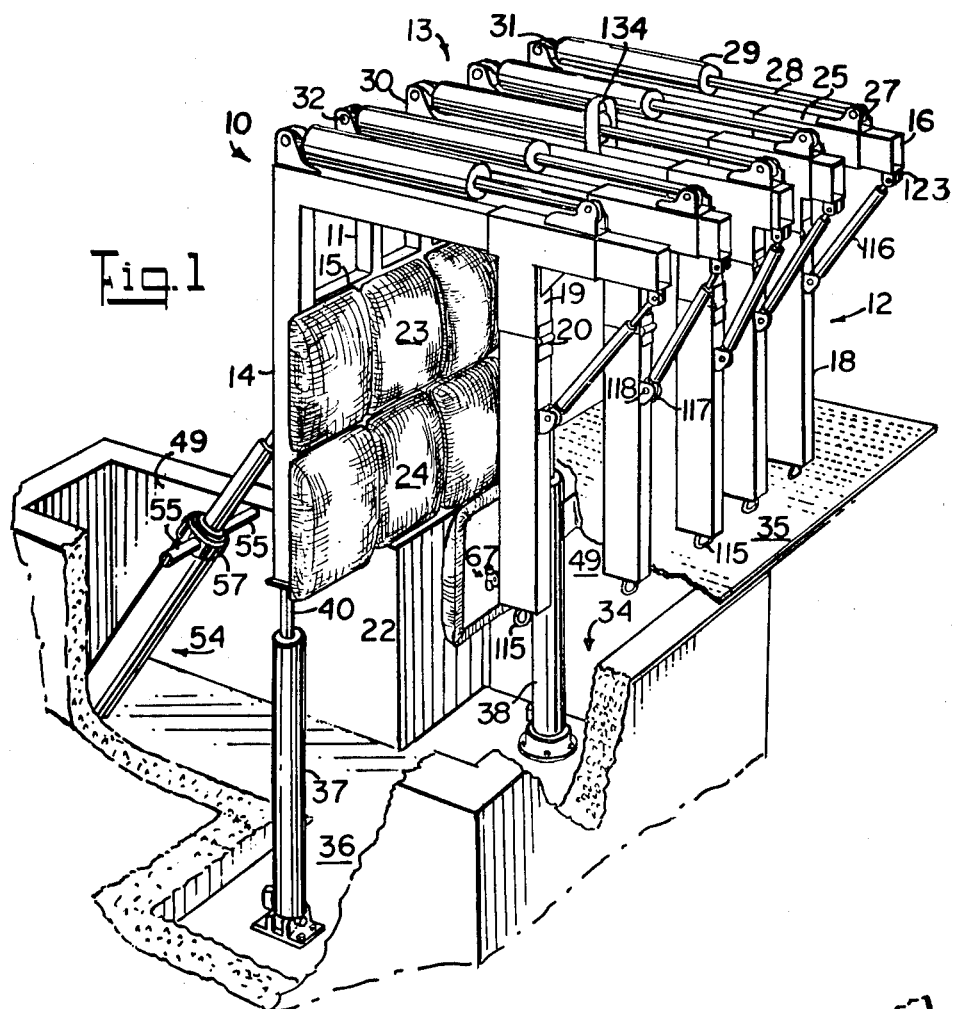
FIG. 1 is a perspective view of clamp apparatus constructed according to the invention, as installed in a surgical theater.

The apparatus shown diagrammatically in FIGS. 1 and 2 comprises a vise unit generally of the form of an open cage framework designated 10, consisting of a fixed side wall framing 11, a selectively movable side wall framing 12 opposed to the fixed side wall, and a top wall framing 13 carried as an integral lateral extension of the fixed side wall framing, all of the walls being constituted as metal structural elements, preferably steel or light alloy tubing.

The planar side wall framing 11 is made up of a spaced series of upright frame members 14 interconnected by longitudinal bracing members 15. The upper ends of the frame members 14 are integrally joined with the ends of respective slide-carrying horizontal frame members 16 of the top wall which extend at right angles to one side of the side wall framing 11. The selectively movable side wall framing 12 also comprises a spaced series of upright frame members 17 each consisting of a lower columnar portion 18 that is supported by a shorter upper columnar portion 19 and connected therewith for rotation about a horizontal axis in a hinge means 20 joining the two columnar portions along abutting edges. The hinge 20 is located on the exterior side of the columnar portions so that the lower portion may rotate relatively to the upper portion between an alignment relation in which their respective ends abut to form a straight continuous upright column 17, and a relatively rotated relation in which the lower portion 18 has been swung through an arc of 90° or more outwardly with respect to the upper portion 19.

Each lower columnar portion 18 of the movable side wall framing 12 carries an upper cushion body 21 and a lower cushion body 22 the bodies being mounted in vertically spaced relation along the inner sufaces of the column and having their adjacent margins closely spaced but not interfering. Each cushion body is directly opposite respective companion cushion body 23 or 24 mounted along the inner surfaces of the upright frame members 14 of the fixed side wall framing 11.

Each upper columnar portion 19 is integrally joined with a slide member 25 that is captively guidedly movable along a respective top wall frame member 16. Brackets 26 carried on the upper surface of the slide member are adapted to be connected with end fittings 27 of a piston rod 28 of an associated linear double-acting hydraulic motor 29 that is mounted parallel with frame member 16. Brackets 30 carried by the upper surface of the frame member 16 at its junction with the associated upright frame member 14 are adapted to be connected with motor end fittings 31, as by pin means 32. The slide member 25 is formed in such way that it is freely movable back and forth along frame member 16, and preferably comprises a sleeve having its internal cross section closely fitting about the external surface of the frame member, and having a length sufficiently greater than any cross-sectional dimension so that it will slide freely without binding due to outward pressure on its cushion bodies. Alternative captive slide members may comprise an encircling framework carrying rollers (not shown) engaging the surfaces or trackways of the frame member 16. To the under surface 33 of the slide there is integrally joined as by welding, the upper end of the short upper columnar portion 19 of a movable upright column 17.

When the vise 10 is in its fully open position as shown by FIG. 2, the transverse distance between opposed cushion bodies such as the upper pair 21, 23 is sufficient to admit passage of the body of a quadruped freely along the chute defined by the inner surfaces of the arrays of selectably inflateable pneumatic cushion bodies. When the piston rods 28 of the respective linear motors 29 are in partly retracted positions the outlines 21' and 22' of the cushion bodies moving with side wall framing 12 shown by dashed lines are contiguous with the surfaces of one side of the animal being immobilized, while fixed cushion bodies 23 and 24 bear against the opposite side of the animal's body. When the position of brackets 26 is offset horizontally outwardly with respect to the inner end of the slide the vise is capable of confining and gripping animals of a wide range of body widths.

Figure 5:
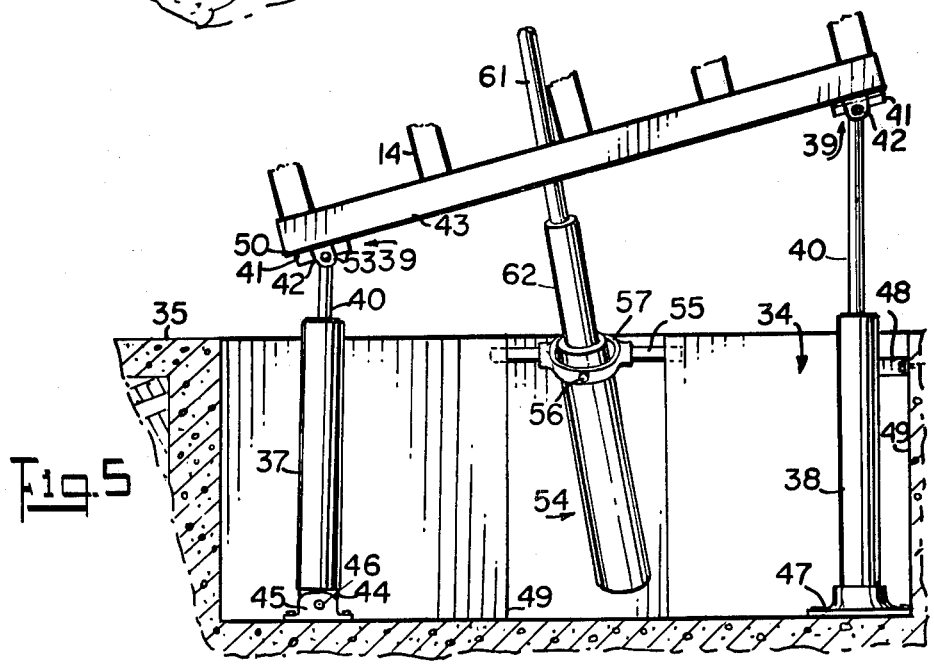
FIG. 5 is a side elevational view of the lifting motors and rigid side-wall frame of the apparatus of FIG. 1. when longitudinally inclined.

The vise framework is arranged to be rotated as a unit about at least two axes at right angles to each other, namely about a longitudinal or roll axis to incline the animal's sides from the vertical, and about a transverse or pitch axis to orient the animal with head down or up, as may be understood by reference to FIGS. 1, 2 and 5. In a fixed installation as would be provided in an animal hospital or surgical veterinary clinic, the vise framework is located above a chamber or recess 34 in a floor 35, upon the bottom wall 36 of which are mounted a horizontally-spaced pair of upright linear hydraulic motors 37 and 38 having end fittings 39 carried by their piston rods 40. The end fittings are pivotally connected by pin means 41 with compound depending brackets 42 carried by a horizontal frame element 43 forming a bottom beam of fixed side wall framing 11. The base-end fittings 44 of one of the motors 37 or 38 comprises flat-sided apertured extensions or lugs that are received within upwardly-projecting brackets 45 which are secured to the bottom wall 36, and which are pivotely connected therewith by transverse pins 46. The other upright linear motor is rigidly secured by its base end 47 to the bottom wall, and may be further supported and braced as by a side strut 48 connected between the motor housing and a side wall 49 of the recess.

Each of the compound brackets 42 provides for universal relative rotation between the end of a piston rod 40 and the horizontal frame element 43 and hence with respect to the entire fixed side wall framing 11. One practical arrangement is realized as spaced sleeves 50 journalled on an axle 41, to the sides of an intermediate length portion of which is secured a pair of apertured lugs 42 pivotedly connected as by pin 53 with the piston rod end fitting 39.

A third linear motor 54 is inclined with respect to floor 35 and is universally mounted by means of a pair of aligned horizontal shafts 55 fixed in recess side wall 49 for rotation about a horizontal axis extending within or parallel with the shaft, and about a second axis transverse to the shaft defined by the pivotal shafts 56 projecting from the housing and journalled in gimbal ring 57. A universally-pivoting bracket 58 fixed on the exterior of fixed side wall framing 11 is connected with the end 59 of outer piston rod 60. It will be evident that the vise framework may be pitched to have either end up or down as may be understood from FIG. 5, by relatively extending or retracting piston rods 40 of upright motors 37, 38, and may be inclined by retracting inclined linear motor 54, which preferably is of multiple telescopingly reciprocable piston type, having at least three extensible portions 60, 61 and 62 of which portions 61 and 62 function both as piston and rod for the corresponding section of the motor.

Moreover, as may be seen in FIG. 2, by extending the piston rods of all three motors by appropriate increments the vise framework 10 may be caused to elevate without any rotation, thereby to raise the body of an animal which may be held within the opposed arrays of cushion bodies, or the raising may be carried out with the vise framework open to adjust its height to receive a longer-legged animal. As will be described at a later point, the vise framework may be rotated about a generally longitudinal axis to bring the side wall framing 11 into the horizontal or even beyond the level.

In order to better comprehend the manner in which the relatively yielding body of an animal such as a bovine or equine quadruped may be gripped and suspended from the sides, without experiencing crushing or bruising force or intolerable shear stress in surface layers of the body, inspection of diagrams of forces and pressure distributions presented in FIGS. 3 and 4 is invited. In FIG. 3 the cross-sectional outline 63 of an animal body is depicted, in equilibrium with the system of forces represented by the several thrust vectors 21T, 22T, 23T and 24T which define by their magnitudes and directions the forces transferred to the animal body from the vise frame. It should be understood clearly that each cushion body 21, 22 23 and 24 has an animal-engaging covering, the surface 64 of which has a predetermined coefficient of sliding friction with respect to the hair or coat on the skin of the animal body side areas, and that this covering, which will be described more particularly later, is moreover non-extensible but flexible. The covering defines a bounding wall of a pressure vessel or container within the interior of which, as will hereinafter be particularly described, a filling of fluid under a controlled fluid pressure may be introduced to distend the covering against the animal body, as indicated by distributed internal arrows 65 signifying unit pressure vectors.

The weight of the animal body supported by a system of four cushion bodies engaging a corresponding length portion of the animal body is assumed to be represented by vertical downwardly directed vector 63T. Negligible frictional support by the upper cushion bodies 21, 23 is assumed because of their inclination, but a small downward thrust component 63T' is assumed as component of the squeeze pressure vectors 21T and 23T tending to depress the body of the animal while restraining it from lateral or upward body movement. Cushion bodies 22 and 24 are assumed to have significant frictional holding effect, due to their favorable inclinations represented by angle $\beta$ being less than 90° and angle $\alpha$ being positive and greater than zero. Each thrust vector 22T and 24T may be shown to be the resultant of a component of thrust force 22P or 24P directed normally to the body surface due to fluid pressure, and a component force 22F or 24F at right angles to the associated pressure vector components and representing the tangential frictional force exerted on the animal body surfaces. The thrust vectors are depicted as pin reaction forces originating in the axes of horizontal pivot pins 66 forming part of universal swivel mountings 67 connecting each cushion body with its associated upright frame member 14 or 18. Each thrust vector may be further resolved into a vertical component nearly equal to half the magnitude of 63T plus the magnitude of additional downwardly-directed force 63T', which has been defined hereinabove. The composite load vector augmented by the downward component of the squeeze force exerted by upper cushion bodies is in equilibrium with the vertical components through pins 66 by reason of transfer through body structure, i.e. internal skeleton and cartilage as well as some tissue shear stress, to the animal body surfaces held.

It should be noted that when the lower margins of the lower cushion bodies 22 and 24 are below and not in contact with the animal body, an equilibrium state of the cushion body covering is characterized by a quasi-catenary curvature of the surface 64 of its upper marginal portion as observed in a sectioning vertical plane, due to the combination of tangential pull on the covering and the simultaneously applied distributed internal pressure.

It should be noted also that by virtue of the location of the axis of pin 66 to be relatively nearer the lower margin of the cushion body 22 or 24, these bodies assume an equilibrium inclination such that they form part of the outline of a trough, i.e. their lower margins are nearer to each other than are the upper margins. If the slope length of the covering which is in contact with the animal body is at least a small multiple of the distance measured from axis of pin 66 to the surface 64 of the covering, the cushion body will be stable, i.e. it will not rotate as a roller but will rest tangentially, although the support plate will have an inclination slightly greater than the average inclination of the engaged surface of the animal body.

It may also be observed that the animal body weight is carried solely or mainly by the lower pair of cushion bodies. Nevertheless an animal immobilizing vise of the form of FIG. 3 utilising squeeze pressurizations of from a few grams per cm to 20 or more grams per square cm has been found to be entirely comfortable to the animal, as confirmed by repeated observations of animals held for periods of a half-hour or more. It has been empirically calculated that in the normal environment of an animal as it rests in a cumbent posture on its belly or side, or even supine, the unit pressure over significantly large areas of the body in contact with the ground may exceed several hundred grams per square cm. However, for comfort the cushion body pressures may from time to time be relaxed and re-applied after a rest interval.

Referring particularly to FIG. 4, a form of animal-immobilizing vise suitable for larger animals and especially pregnant females is depicted having six cushion bodies for each longitudinal unit of framing length, arranged as three opposed tiers with the cushion bodies on each side wall spaced vertically but unequally. An auxiliary lowermost pair of cushion bodies 68, 69 are carried by horizontal sliding beams 70 that are respectively supported by the lower end portions of upright frame member 14 and by lower columnar portion 18. The greater part of the weight of the animal is supported by the auxiliary cushion bodies, the coverings of which have nearly horizontal inclinations and have their innermost marginal portions closely adjacent or even contiguous so that the convex belly curvatures are closely matched by the profiles of surfaces 64. Accordingly, the thrust vectors 68T, 69T are directed more nearly along the vertical. The pressurization of the auxiliary cushion bodies may be controlled at a higher value than for cushion bodies which engage the sides of the animal, or the entire group on each side may be uniformly pressurized, or where relatively great immobilizing forces are needed the pressurization of bodies 21—24 may even exceed the pressurization of the auxiliary bodies.

The details of construction and of positioning and mounting of the cushion bodies may be more fully comprehended by referring to FIGS. 6 through 10 inclusive. As may be seen best from FIGS. 6 and 8, the cushion body is a composite structure having a covering member 71 formed as a slip-on envelope or casing of fabric having a suitable high-friction surface 64 such as a silicone rubber clad or coated woven cloth of polyester or glass fiber filaments, having marginal portions stitched and/or cemented to form inturned flanges 52 fitted over the edges 73 of a rigid support plate 74. By tensioning a suitable retaining cord (not shown) looped through an edge tube 72 formed on the rearward face of the plate in flange portions 52, the covering is prevented from being dislodged by animal movements or by its suspended weight, but may readily be removed for cleaning or replacement.

The casing 71 is suitably dimensioned so that when the rubber bag or bladder 75 carried on the forward side of plate 74 is distended, the surface 64 assumes a pillow shape, for example extending outwardly 15 cm or more from the support plate. The bag or bladder 75 may be formed in any way by molding and/or cementing sheet rubber stock so that a chamber 76 between opposed walls 77, 78 is formed, the chamber being closed by a perimetral junction or seal 79 integrally connecting the walls. Back wall 78 is pierced by a fitting 80 by means of which a gaseous fluid such as compressed air may be admitted into or withdrawn from the chamber. Such fitting may comprise any suitable device for admission of air through a rigid wall, such as an elongate externally-threaded tubular body having a shoulder nut 81 pressing against the rear side of plate 74 and having a flat nut 82 or disc secured as by threaded engagement with the end portion 83 of the tube projecting within the chamber 76, gripping the bag wall 78 between it and the plate and forming a seal. A flexible conduit 84 connects with the fitting in any suitable manner as by a compression joint 85.

Envelopes or casings 71 are preferably stored as sterile units which are fitted over disinfected bags or bladders 75 and their associated support plates 74 just prior to use of the immobilizing vise in a surgical treatment or procedure, therefore the casings should be made of materials that can withstand repeated sterilising steam temperatures. The desired pillow form will usually be rectangular, as where the array of cushion bodies on each side wall is in horizontal tiers and vertical files and the positional pattern provides minimal clearance distances between adjacent cushion bodies.

The cushion bodies are mounted for limited universal rotation with respect to the plane of fixed or movable side wall framing 11 or 12. One practical mounting arrangement comprises a mounting bar or plate 86 secured in a vertical plane normal to the surface of an upright frame member 14 or 18, as by welding, of a length to project inwardly a distance of about 10 cm. The bar is apertured to receive a bolt 87 that is passed through a horizontal bore of a two-axis joint member 88 that is pivotedly connected by bolt 89 passed through its vertical bore and also through a pair of spaced brackets 90 fixed in vertically spaced relation on the rearward side of plate 74. The plate is therefore free for limited rotation about a horizontal axis in pivot bolt 87 and for limited rotation about a vertical axis in pivot bolt or pin 89. One suitable arrangement for limiting the vertical swing comprises shaping upwardly-inwardly inclined edge 91 and downwardly-inwardly inclined edge 92 on the inward end of each bar 86, against which inclined edges the rearward surfaces of upper and lower portions of bracket pair 90 may abut to define the limit positions of the swing. Preferably, the bracket pair 90 are located below the mid-point of plate 74 so that when the cushion body is tipped back its center of mass will be nearly in vertical alignment with the axis of bolt 87, or even offset outwardly with respect to that axis, whereby the cushion may rest stably in tilted-back attitude. The joint member 88 is preferably bifurcated to straddle the end of mounting bar 86, and spring washers 93 are preferably interposed under compression between the side surfaces of the bar and the inner surfaces of the bifurcated portion to provide a friction-holding effect tending to maintain the cushion body in any position into which it is manually moved.

Bracket pair 90 preferably comprise short sleeves welded to the back of plate 74 in coaxial relation. Joint member 88 preferably has its forward marginal portion shaped to provide limit stop surfaces 94 against which the rearward surfaces of the plate to either side of sleeve pair 90 may abut to establish limits of swing about the axis of pivot pin or bolt 89 received through the sleeve pair.

Figure 13:
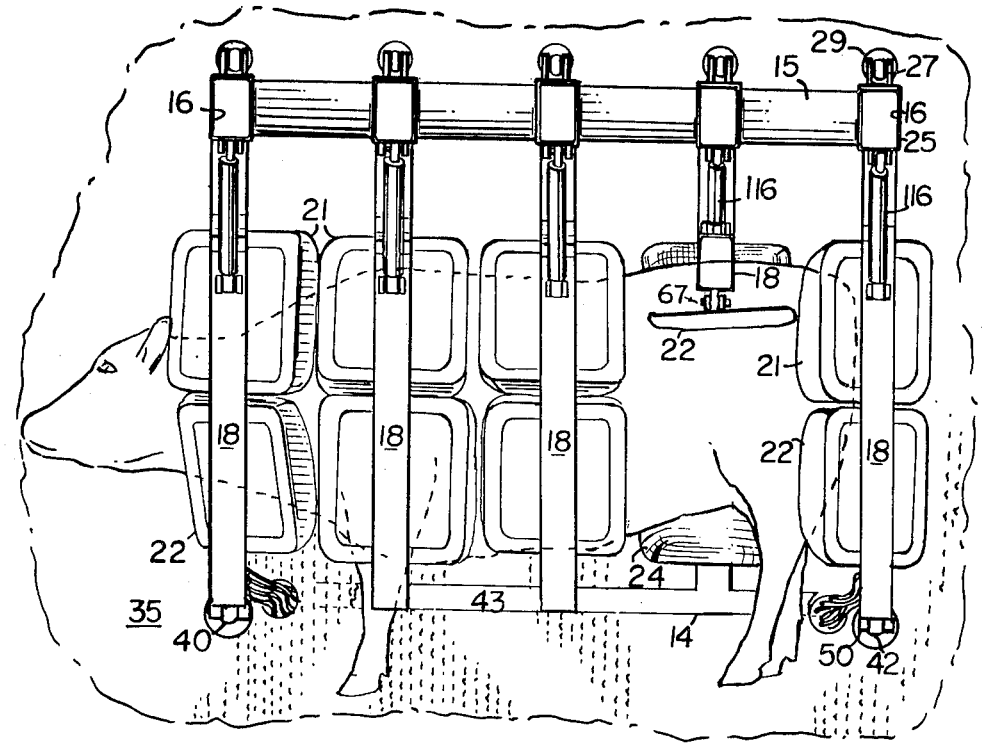
FIG. 13 is a plan view of an immobilized animal held in horizontally-inclined clamp apparatus of FIG. 1 with one of the columns raised to give access to a flank area of the animal.
Figure 15:
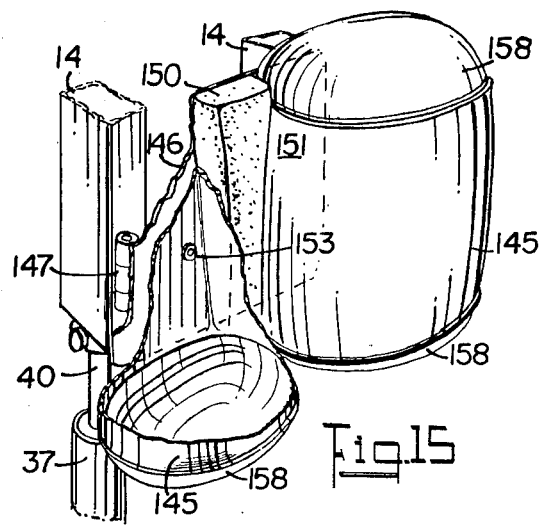
FIG. 15 is a perspective illustration, partly cutaway, of the leg-hold shown in FIG. 14.

It is to be understood that a number of other arrangements for universally swivelling the cushion body in the vise framework may be designed, but whatever the form of mechanism adopted, the freedom of the cushion bodies to orient themselves so that their respective support plates are generally or nearly tangent to the average inclination of the body area of the animal against which covering surfaces 64 are pressed is highly desirable. Such freedom to swivel is even more important to enable a single vise unit to accomodate widely diverse animal body forms and body sizes. As may be seen in FIG. 13, showing an installation such as that described with reference to FIGS. 1 and 2 in horizontal attitude, the cushion bodies engage contacted areas of an animal such as a steer with various inclinations according to the curvatures of the body part presented, and press the largest possible area of cushion surface 64 against the animal from its rump to the root of the neck.

Universal swivelling of auxiliary cushion bodies 68 and 69 is similarly provided by employing joint members 88 which are pivotedly connected on the inner ends of sliding beams 70, and limit stops equivalent to shaped edges 91, 92 and 94 are similarly provided by shaping the end of the beam as was described for bar 86, and by shaping that upwardly-facing marginal portion of the joint to restrict rocking (pitching) about a transverse axis through bolt 87. The adjustment of position of ech auxiliary body 68 or 69 may be understood from FIGS. 8 and 9, showing beam 70 slidably received through respective pairs of aligned apertures pierced through upright frame member 14 and columnar portion 18. The wall portions through which the apertures are pierced may be suitably strengthened as by welding on additional plates 96. A series of horizontally spaced depressions 97 recessed into one side of the beam 70 permits the conically or spherically shaped end 98 of a threaded locking bolt 99 to be seated in a selected recess, by turning a hand wheel 100 fixed on the end of the bolt remote from the pointed or rounded setting end, to advance or retract the bolt in internally threaded apertured boss 101 carried on a transverse wall of upright frame members 14 or columnar portions 18. Where an immobilizing procedure does not require use of an auxiliary cushion body, it is removed by sliding its beam 70 inwardly entirely through the upright frame member or columnar portion. In other procedures to achieve the widest free passage between cushion body arrays each beam 70 is slid outwardly to its limit and the cushion body carried thereon is tilted into parallelism with its associated side wall array.

In general, the arrays of cushion bodies disposed on either side wall 11 or 12 will cover nearly the entire elevational area of the side wall except adjacent horizontal frame member 43 and adjacent the upper ends of frame members 14. The cushion bodies on the fixed side wall will be presented to the underside of the animal when the vise framework has been inclined into the horizontal, hence the animal is positioned with its heat at either end a required to expose that side upward on which treatment or surgery is to be performed.

The cushion bodies 21 and 22 on lower columnar frame portions 18 may be dimensioned to provide openings between adjacent cushion body margins, and the locations of the openings may be adjusted, as where a specific small area of the animal side should not be pressed, or is to be left accessible without folding the upright frame 17. The mounting bars 86 of some or all of the columnar portions 18 may be mounted on slides 102 as depicted in FIG. 10 permitting limited longitudinal shifting in either direction relative to the center of the upright frame. A pair of right-angle section guide members 103 are fixed as by welding on the inward vertical surface of columnar portions 18 to receive slide 102 therebetween for free longitudinal guided sliding movement in close surface contact with the columnar portion. A mounting bar 86 of form similar to or identical with the mounting bar of FIG. 6 is welded to the inner side of slide 102. The associated cushion body may be shifted prior to its inflation to grip the animal, or all cushion bodies along one tier to either side of a specific body area may be shifted to provide access to that area.

As has been explained previously with reference to FIGS. 1 and 2, each movable upright member 17 is foldable outwardly about a longitudinal axis in hinge 20, to take up a position in which the lower columnar portion projects at right angles to the upper portions, in the manner as evident from FIGS. 11 and 12. In a portable embodiment of an animal-immobilizing vise according to the invention shown in end elevation view in FIG. 11, the entire group of columnar portions 18 have been swung into the vertical while fixed side wall 11 is horizontal on the ground surface. Such form of vise has particular utility for loading and transporting animals which may be in a torpid or unconscious state or too enfeebled to stand or walk into the chute formed by opposed arrays of cushion bodies when the vise walls are open.

One latch arrangement that may advantageously be used in such vise is shown in FIG. 2, in which the columnar portions 18 and 19 are held in their abutting aligned relation by means of latch member 104 having a shank 105 mounted on axle 106 which is disposed with its axis in the longitudinal direction of the vise, and which is pivotedly carried in bearings formed in or carried on side surfaces of the upper end of columnar portion 18. The latch shank has its upper end formed as a hook 107 adapted to engage in locking relation over a rod 108 fixed between opposed side surfaces of the upper columnar portion. A concentric roller or sleeve (not shown) may be journalled on rod 108 to minimize latch-engaging or latch-releasing friction. Rod 108 also acts as a limit stop against which the inner side of the latch shank bears under pressure of bias spring 109 which is interposed between the outer wall of the columnar portion 18 and the latch shank. A second rod 110 fixed between opposed side surfaces of lower columnar portion 18 provides a limit stop to restrict movement of the latch shank when the member 17 is folded as in FIG. 11.

To release latch hook 107 from lock rod 108, the latch is provided with a crank arm 111 extending at right angles to the latch shank, for example horizontally outwardly in the view of FIG. 2, there being connected to the outer end of the crank arm a suitable link 112 such as a rod or chain, which extends downwardly within columnar portion 108 and connected with the end of a guide rod 113. The rod 113 is guided in an apertured lug or bracket 114 fixed across the lower open end of the columnar portion 18 and has mounted on its other end, a suitable pull handle 115. By the application of a sufficient pulling force to the handle, the crank arm may be rotated sufficiently to disengage latch hook 107 from lock rod 108, so that frame 17 may be folded by swinging portion 18 outwardly as far as required, and held in position by any suitable holding arrangements, such as will next be described.

While the columnar portion 18 may be swung out by an attendant or rotated on hinge axis 20 by any suitable manually powered devices such as cables and pullies, preferably the folding and straightening of each upright frame member 17 is accomplished with the assistance of a type of passive hydraulic piston-and-cylinder mechanism 116 cooperating with the slide-actuating linear motor 29. Passive unit 116 has end fitting 117 of the barrel pivotally connected by pin 118 to lug pair 119 secured to portion 18 a short distance below hinge axis 20, and has its end fitting 120 of piston rod 121 pivotedly connected by pin 122 with lug pair 123 secured to the under surface of associated horizontal frame member 16 at the extreme outer end thereof. The linear motor barrel and piston rod are so proportioned that when the upright frame member is in its unitary straightened and latched condition and is displaced to its outward limit, i.e. when outer end of slide sleeve 25 abuts lug pair 123, the piston rod is fully retracted.

As may be best seen from FIG. 2 and FIG. 12, passive linear motor 116 has no connection with any pressurized fluid supply or discharge sump, but instead is provided with a closed fluid circuit between cylinder spaces on either side of piston 124, the circuit including flexible conduits 125 of small internal diameter connected to a block 126 mounted on one end of the barrel. A further conduit 127 which may be a metal pipe or a duct formed in the body of the barrel, connects between the block 126 and an end block 128 mounted on the other end. A fluid path is provided by way of openings 129 communicating with the cylinder end spaces and leading into respective end blocks, by way of conduit 127, along one flexible conduit 125 through valve body 130 and valve 131 when open, thence by way of the other flexible conduit to the other end of the cylinder. When valve 131 is closed by suitably actuating lever arm 132, the columnar portion 18 cannot rotate due to the incompressiblity of the hydraulic fluid filling the entire cylinder, valves and conduits of the system, even though latch 107 is released. If however the slide 25 has first been fullly displaced outwardly as shown in FIG. 2 while valve 131 is open to allow piston 124 to move toward opening 129 of block 126, and the valve is closed while the piston is in the relative position shown in FIG. 12, by unlocking latch hook 107 and then actuating hydraulic motor 29 to retract piston rod 28 and with it the connected slide 25, portion 18 will be caused to swing to the right-angle relation shown in FIG. 11. Similarly, the reactuation of hydraulic motor 29 to cause slide 25 to move outwardly will cause portion 18 to swing toward the opposite side wall framing 11, and sloping edge 133 of latch hook 107 will move in an arcuate path to meet lock rod 108, causing the hook to be deflected by sliding over or rolling over the rod and causing the latch shank to overcome the pressure of bias spring 109 and to rotate away from limit stop rod 110, until the hook snaps into locked relation over rod 108.

The columnar portion may at any time be manually swung to any desired position and left in that position by suitably opening and closing valve 131, but the slide cannot be moved by its motor 29 unless valve 131 is open to accomodate movement of piston 124.

For convenicence of manipulation, valve body 130 is preferably located within columnar portion 18 near to lug pair 119 to minimize the lengths of conduits 125, and valve-actuating lever 132 is preferably linked with crank arm 111 so that when guide rod 113 is withdrawn, during the latchunlocking movement of handle 115, the hydraulic circuit is closed. Rod 113 may be locked in its withdrawn position by any suitable holding device, as by forming a key-slot aperture in bracket 114 and providing a hook or projection (not shown) on the rod at a position such that handle 115 may be turned while the projection is outside bracket 114 to enable it to be retained in that withdrawn position. When handle 115 is a "D" handle, the arrangement described provides a visual indication that the valve is closed and the latch released. The latch may be locked and the valve opened simply by releasing the handle to allow latch bias spring 109 to actuate both lever 132 and latch shank 105.

In the portable form of animal-immobilizing vise shown in FIG. 11 top-wall framing 13 includes an eye 134 connected by a pair of straps 135 with the sides of central horizontal frame member 16 at a distance from the fixed side wall framing such that when an animal body has been immobilized between the arrays of cushion bodies, a cable 136 may be connected therewith as by a snap hook 137, and the vise raised by a lifting means such as a gantry crane or like means (not shown) or a helicopter. The vise structure thus suspended may be transported, provided that the necessary hydraulic and pneumatic fluid supplies and controls which will be described hereinafter are included to maintain the motors 29 in position and to maintain cushion body internal pressures.

In a portable form of vise all fluid lines 138 associated with the hydraulic motor group 29 and all air supply conduits 84 are led to one side of the top wall as a bundle, rather than into the floor 35 as in the vise of FIG. 1, and suitable connections are provided (not shown) with pump and control systems as will be discussed for FIGS. 22 and 23 at a later part.

The fixed side-wall framing 11 includes in lieu of lifting motors 37, 38, a relatively wide stand-off bar 138' having a foot 51 and being adapted to be pinned to the compound brackets 42 by pins 41, the connection being suitably disconnectible. Such stand-off permits the vise to be temporarily rested on ground on the feet 139 with no risk of injuring the legs of an immobilized animal. The portable vise may serve as a temporary surgical table in the field, or it may be transported to a clinic or surgical theater and mounted on existing linear motors 37, 38 and 54 to provide a vise unit equivalent to the units of FIGS. 1 and 2.

A further cushion body 140 is provided for supporting an animal's head in installations where the animal will be laid in the horizontal or anaesthetized in the vertical, or to restrain its head and neck movements by which it would be likely to injure itself. The cushion body need not be pressurized, and preferably substitutes a foam-rubber or polyurethane block in place of bag or bladder 75, but consists of the same support plate 74 and removable casing 71. The support plate need not have a universal swivel mounting but may be permanently fixed to a lateral bar or plate 141 which is carried on the end of a slide beam 142. The beam is disposed for longitudinal reciprocation through shaped apertures 143 in the end upright frame members 14 of the fixed side wall, or alternatively in the end columnar portions 18 of the movable upright frame members 17. The head and/or neck of the animal may be restrained against the cushion 140 by any suitable comfortable bindings such as padded leather or rubberized belting.

The provision of leg-restraining means shown in FIGS. 14 through 17 is not always necessary, when dealing with shortlegged animals (see FIG. 13) whose body dimensions are such that lower cushion bodies 22 and 24 apply adequate restraints to prevent pawing sideways motions by the animal's forelegs, and to prevent backward kicking by the hind legs. Nevertheless, for utmost safety to the animal and to prevent injury to attendants it is highly desirable to engage and immobilize the legs of the animal while it is still in standing position within the chute between arrays of cushion bodies that have not yet been moved sufficiently close to the animal or sufficiently pressurized to hold it immovable. To achieve this objective, a modified cushion body structure designated 144 comprises a pair of relatively large flexible barrel-form pressure vessels 145 spaced longitudinally along a support plate 146 spanning the two end upright frame members 14 and movable upright frame members 17. Each support plate is pivotedly mounted by hinge 147 secured on the inner side of the end upright member, so that the cushion body may be swung forwardly ahead of the vise unit and removed from the hinge structure when not required. The plate carries a locating post 148 on its rearward surface at a position to come into contact with the other upright member of the end pair of frames, preferably registering in a locking aperture 149 and incorporating any suitable releasable latch arrangement (not shown) maintaining the plate longitudinally oriented and incapable of being moved by the animal when held.

Each pressure vessel 145 is secured against the outer surface of plate 146 in such relation that a yielding cushion pad 150, of a material such as a foamed rubber or polurethane may be received and adhered to the plate between the vessels in upright position, with its vertical side surfaces contiguous with and abutting the vessel side walls 151. The form and dimensions of the pressure vessels are so chosen that side walls 151 may be distended toward each other by forcing air under pressure thereinto as by conduit 152 and fittings 153 until they meet and occupy almost the entire space adjacent the forward side of cushion pad 150, and until the side walls of opposed pressure vesselsmmounted on opposite sidewalls of the vise also meet in the manner depicted in FIG. 17. A substantial part of each pressure vessel distends in longitudinal direction away from the meeting side wall areas 151. It will generally be necessary that the forward and rearward extents of the distended pressure vessel pair on a plate 146 be at least equal to the distance between opposed plates in normal immobilizing position of moving wall 12, and may advantageously be a greater horizontal distance, so that for a given low internal pressurization the possibility of longitudinal deformation by the struggles of the strongest animal will be minimal.

When the leg of an animal as represented by outlines 154 is positioned against cushion pad 150 between a pair of pressure vessels 145 and the vessel walls are distended sufficiently, the side walls 151 move into close contact against the animal's leg and press upon its forward and rearward surfaces 155, 156, thereby restraining longitudinal movement by both holding pressure and by friction developed with respect to cushion pad 150 and walls 151. However the leg is not gripped so strongly as to impede circulation. Lateral outward movement of the leg is positively restrained by the cushion pad 150, while inward transverse movement is prevented by frictional restraint and by an outward component of internal gas pressure exerted on the inside of the leg by vessel wall sector 157. When the vertical extent of the pressure vessels in engagement with the leg is of the order of 30 to 50 cm or more and the internal pressure of the vessels is of the order of 15 to 115 grams per square cm or higher, the animal can do little more than slightly deflect the vessel walls and is entirely safe from self-inflicted injury since it can neither lift nor bend its leg. A significant part of the weight of the animal can be carried by the leg-hold structure when the legs are immobilized as described.

By providing for rapid, almost explosive filling of the pressure vessels from a suitable source of compressed air, or gas, located on or in the vise framework, utilizing conduits of adequately large cross-sectional areas, the legs of an animal can be grasped in a fraction of a second provided they are positioned alongside the four cushion pads 150. Separate controls for filling the pressure vessels provided for the forelegs and for the hind legs are preferably employed, so that either pair of legs may be gripped. Preferably, hinge structures 147 are adjustably secured on support plates 146 to vary the longitudinal spacing of cushion pads 150, and posts 148 provided with accomodating recesses.

In order to release an animal, the conduit 152 is connected to a source of low pressure which may be atmosphere or a sub-atmospheric vessel to allow the inflated pressure vessels to expel air and thereby to remove both the frictional holding and the pressure holding effects of the vessel walls on the animal's leg. Preferably, the conduit 152 is connected to a source in which the pressure is maintained well below atmospheric to cause the pressure vessels to deflate rapidly and nearly completely so that the vessel walls lie closely against the support plates 146. When fully deflated, the vessel walls do not project inwardly any further than do the cushion body arrays lining a side wall framing, hence the chute presents substantially no projections against which the animal may injure itself by kicking or charging. To further improve safety of the animal, support plates 146 have their margins rounded and preferably curved outwardly.

The pressure vessels may be formed of a rubber material and may have a degree of extensibility, or they may comprise a rubberized fabric having only a minor degree of distendability, for example a rubber-clad nylon cloth. That side wall which is adhered to the surface of support plate 146 is preferably strongly cemented and may advantageously also be gripped by an internal plate (not shown) of suitable rigidity clampled by fittings 153 or further fasteners such as rivets or bolts (also not shown) so that the support plate is covered nearly entirely or wholly by the vessel wall. The vessels may advantageously be constructed as a generally cylindrical barrel po-tion forming side wall 151 and having closing end walls 158 which when distended are of oblate spheroidal form and which may have the upper end wall located to exert upward pressure on the animal's chest. For the most rapid filling and distention the wall thickness should not be so great that its thickness would impede smoothing out and intimate conforming of the wall surfaces 151 about the animal's legs.

An alternative form of immobilizing vise preferred for holding large animals, for example mature bulls of the larger beef breeds, certain breeds of draft horses, and certain zoo animals, or animals of the wild state such as moose, buffalo, hippopotami and many other species as may require medical attention, comprises that shown in FIG. 14 having twelve cushion bodies on each side arrayed as two tiers of six. Where the animal is a horse, the design dimensions would be determined so that the most forward cushion bodies exert pressure on the upper foreleg and over the withers, and the most rearward cushion bodies press inwardly and forwardly against the rump and behind the rear knee. The forward and rearward pairs of fixed and movable upright frames, 14 and 17, support leg-hold cushion bodies 144, while the central pairs of upright members on each side carry auxiliary cushion bodies supported on respective sliding beams clamped in the lower portions of the apertured frames. A head-restraint cushion pad 140 is mounted to project longitudinally at the height of the animal's jawbone. The weight of the animal is partly supported by the lower tier of six cushion bodies on each side, by the leg-hold cushion bodies, and by the four auxiliary cushion bodies under the belly. The under-belly support may be achieved with bag or bladder pressures under 120 grams per square cm while the remainder of the animal's weight may be carried by the lower tier of side-mounted cushion bodies pressurized at considerably lower unit pressures.

In the larger forms of immobilizing vise such as that in FIG. 14, the forces that may be exerted on the latch and locking elements of the foldable upright frames 17 may be high. One form of alternative latch shown in FIGS. 18 and 19 of greatly increased holding capability locates the latch pivot axis inwardly of columnar portions 18, that is, between the two side wall framings so that the horizontal distance between the hinge axis and the locking surfaces of the latch is as large as possible. The latch comprises a pair of elements each having strap-form shank portions 159 and crank arm strap portions 160, the elements being disposed on opposite sides of an upright moving frame member 17 and being ganged to rotate as a unit with a joining axle 161 which is journalled in a tubular axle housing 162 strongly secured as by welding to the inner surface of the upper part of columnar portion 18. A roller 163 journalled by its end pins 164 in the upper ends of the latch shank straps 159 extends between the pair of elements, and when the straight columnar relation of portions 19 and 18 is to be held, the roller rests closely upon a transversely-extending ledge 165 projecting to the same side of the frame portion as axle housing 162 but is located on the upper portion 19.

The hinge for the foldable frame member 17 in this embodiment is preferably located outwardly of the outer wall of member 17, and is formed by a transverse axle 166 journalled in a plate weldment 167 which is the structural equivalent of tubular columnar portion 19 in the vise of FIG. 1. The weldment is a three-sided box-like member welded to depend from slide 25. Plate extensions 168 secured on the forward and rearward surfaces of the upper end of columnar portion 18 project upward to span the junction of portion 18 with the weldment and extend upwardly and outwardly, being secured to projections of hinge axle 166.

Crank arm straps 160 are connected by a handle 160A which extends longitudinally of the outer side of columnar portion 18, providing a means for manually releasing the latch roller when the handle is forced upwardly to rotate the latch shanks far enough to cause roller 163 to disengage from ledge 165. A safety lock particularly desirable for portable vises comprises a pair of lock straps 169 carrying at their lower ends pin projections 170 and being pivotally mounted by their upper ends in plates 168 for rotation about axle pins 171 mounted on opposed inner surfaces of the plates. When the lock straps are swung forwardly to slide keeper pins 170 into engagement with the upper side edges of crank arms 160, roller 163 is positively urged into a stable rest position against the inner vertical surface 172 of weldment 167. A bias spring 173 is arranged to exert a pull on lock straps 169 tending to maintain keeper pins 170 engaged with the crank arms, and in their limit position any upward pressure that may be extended on the crank arms is resisted by the keeper pins which are in a stable toggle position relative to the line of action of the upward pressure transmitted by the crank arms. In order to release the latch, the lock straps 169 are first rotated outwardly to free the crank arms which are then pushed upwardly by handle 160A, preferably against a bias force provided by a suitable torsion spring or springs (not shown) having an end anchored in axle housing 162 and the other end secured to tend to maintain latch shanks 159 rotated toward the weldment face 172.

The re-latching of columnar portion 18 following folding outwardly is simply effected first by holding lock straps 169 retracted and secondly swinging the lower frame portion into parallelism with the other side wall, causing roller 163 to impact sloping inner surface 174 of ledge 165 and to deflect the latch shanks 159 until the roller can snap over the ledge then restoring the latch lock.

For minimal sliding friction of sleeve 25 on frame members 16 nylon glide plugs 175 or other low-friction or self-lubricating rigid bodies may be interposed between the sleeve and the frame member as may be seen from FIGS. 18 and 20. The plugs are seated in holes 176 near the ends of the sleeves, so that no direct contact between metal parts occurs. A significant reduction in power requirements for transportable vise units is effected by use of such components, which may be powered solely from a battery supply or compressed air storage vessel.

One form of land vehicle with which the transportable forms of the immobilizing vise may be combined is a trailer unit generally designated 177 as shown in FIG. 21. The trailer comprises a frame 178 having a hitch 179 connected at its forward end intended to enable towing of the trailer as by a tractor or truck to a field or range location to treat or pick up a sick or injured animal. On the vehicle frame are mounted at the rearward end, a pair of lifting motors 37A, 38A, having their cylinders upright and fixed on the ends of the vehicle frame which may be suitable widened by framework to accomodate a vise length of the order of 200 cm or more. Cylinders 37A and 38A are served by fluid lines 125. The ends of the piston rods are connected with respective fittings 180 of universally swivelling form which are carried on the longitudinally outward surfaces of end upright frames 14 by respective lugs 181, of a transportable vise framework generally designated 10A. An inclined linear motor 54 of compound form including for example two or more telescopingly arranged piston rods is mounted in the vehicle frame for pivoting about a transverse horizontal axis, and has its outer end connected with a universal fitting 58 carried by the fixed side wall framing, the arrangement being essentially similar to that described for the vise unit of FIG. 1 except that provision for pitching of the unit is not included hence motor 54 need be provided only with single-axis journalling.

A power unit 182 which may be electrical storage batteries or a motor-generator unit, and associated motors, pumps and compressors (not shown) serves a control unit designated 183 from which fluid lines 125 and air lines (not shown) lead to the respective hydraulic and pneumatic components of the vise unit. In control unit 183 are fitted such control devices as will enable an operator to effect the several operations of raising and lowering, inclining or erecting the vise framework, as well as inflation and deflation of the cushion body pressure chambers and operating cylinders 29. The components and circuits of hydraulic and pneumatic systems incorporated in power and control units 182 and 183 will be elaborated in greater particular in the further description which follows.

The vise framework 10A is preferably constructed of light weight materials, such as aluminum or magnesium alloy metal tubing to permit the unit to be moved over soft ground, and the number of ground wheels of the trailer unit should be chosen so that very low average bearing pressures, and low inflations, are realized.

While it will be generally possible to transport an animal that has been immobilized within the vise framework and raised clear of the ground in upright attitude, the center of mass of the combined weight of the animal and framework may be moved forwardly of the ground wheel axles by inclining the vise into the horizontal with its fixed side-wall framing 11 overlying and near to the vehicle frame. In such mode of transport the held-hold cushion pad 140 should be mounted to carry the animal's head as an under-support.

DESCRIPTION OF HYDRAULIC SYSTEMS

Figure 22:
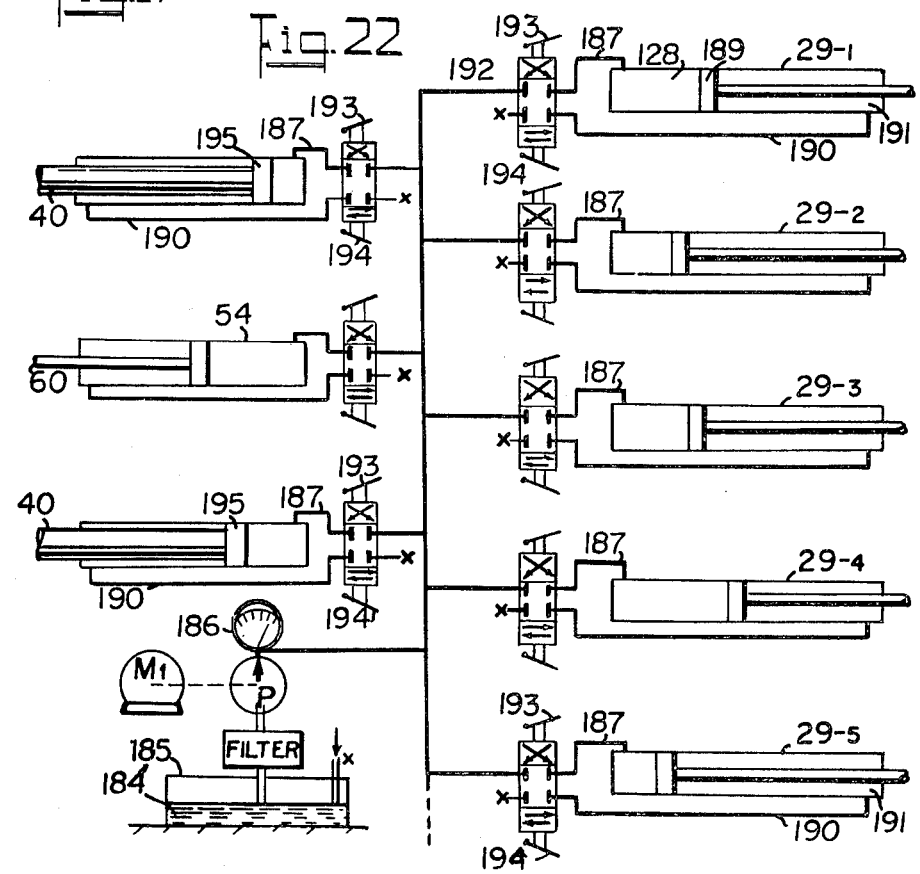
FIG. 22 is a schematic diagram showing control and power circuits for the apparatus of FIG. 14 operated hydraulically.

A schematic diagram is shown in FIG. 22 of a hydraulic power and control system incorporated in either a permanently installed vise unit or in a portable vise unit, as a single line diagram depicting high-pressure fluid flow paths wherein low pressure returns are indicated only by a cross marker X.

A motor M which may be electrically powered drives a constant pressure pump P which withdraws hydraulic fluid 184 from a sump 185, delivering it at a regulated pressure which is visually indicated by gauge 186 to trunk line L. The horizontal linear motors designated $29_{-1}$, $29_{-2}$, $29_{-3}$, $29_{-4}$ and 29-5 associated with respective slides 25 and moving upright frames 17 of FIG. 1 are provided with pressure conduits 187 communicating with the cylinder spaces 188 at the left of respective pistons 189, and with pressure conduits 190 communicating with cylinder spaces 191 at the right of the pistons. The pair of pressure conduits for each cylinder are served by four-way closed-center hydraulic control valve 192 which is provided with control levers 193, 194 at opposite ends, which levers may comprise parts of a solenoid-actuated electrical control device incorporated in the valve, or which may be arranged for direct manual operation from a suitable panel (not shown). In accordance with which lever has been selectively actuated, a piston rod 28 of the associated linear motor 29 is caused to be moved either to the left or to the right as hydraulic fluid from trunk line L is fed to either the right or left sides of a piston 189. For example, actuation of control lever 193 will cause a slide 25 to move outwardly, i.e. to open the vise at a particular upright frame, while actuation of control lever 194 will cause the reverse movement of the piston rod and slide.

Similar four-way closed-center hydraulic control valves 192 are utilized to control the raising and lowering of piston rods 40 of upright linear motors 37 and 38, or motors 37A and 38A, which preferably are double-acting differential piston rod devices connected and arranged so that the head space to the right of each piston 195 is enlarged as the piston rod moves to raise the vise framework. Inclined linear motor 54 is similarly controlled and operated.

DESCRIPTION OF PNEUMATIC SYSTEMS

In schematic diagram, FIG. 23, there is shown a system of lines and control valving for supplying air at elevated pressure to certain cushion bodies and for either supplying air at high pressure to certain other bodies or for withdrawing air therefrom into chambers having reduced internal pressure.

The high pressure supply system comprises a drive motor $M_2$ driving a compressor $P_2$ which takes in air from atmosphere and supplies it via check valve $V\text{-}_{CK}$ to pressure vessel 196. This vessel is a primary storage tank which is provided with an air pressure gauge 197, and the motor is preferably provided with a pressure limit switch 198 sensing tank pressure by way of line 199 and controlled thereby to maintain a predetermined high vessel pressure, for example 500 to 1000 grams per square cm or more.

The supply is led via shut-off valve 200 to a pressure regulator 201 that may be set to a desired maximum bag or bladder pressure, the output of which passes through a further check valve $V\text{-}_{CK}$ to common trunk line 202, in which is maintained, for example, a pressure of several hundred grams per square cm but significantly below the pressure in primary storage tank 196.

The arrays of cushion bodies 23, 24 of the fixed side-wall framing 11 are depicted by a single upper and a single lower cushion body, shown as having a common supply conduit 84 as was described with reference to FIGS. 6 and 8. It is to be understood that the cushion bodies which are here schematically diagrammed may be jointly supplied with auxiliary cushion bodies 68, or such auxiliary bodies may be served by a duplicate control system from trunk line 202. Similarly, cushion bodies 21, 22 of side wall framing 12 may be served jointly with cushion bodies 23, 24 or by a separate control system, the latter serving bodies 21, 22 jointly with auxiliary bodies 69, or, separately therefrom.

Relatively high pressure air is led from the trunk line by way of a shut-off valve 203 to a pressure regulator 204, which functions to maintain a constant lower pressure output to duct 205 (which may be tubing or piping led under floor 35 of a clinic) to a control valve 206. Such valve is diagrammatically represented as being a rotary device which may be selectably actuated either by direct manual manipulation or remotely by electrical rotary motor bi-directional means of known type, to connect the vessel 207 with flexible conduits 84. The vessel 207 may advantageously constitute the internal spaces of tubular framing of which the vise is constructed to provide a "spring" or take-up volume whereby the bag or bladder pressure will be nearly constant whether its deflection by animal body pressures. A gauge 208 may be provided on the vise framing, for visually indicating internal pressure of the cushion bodies connected with vessel 207, particularly where valve 206 is of the type that may be positioned between a filling position and a discharge position allowing air to discharge from the cushion bodies to atmosphere via posts 209.

A similar control system or systems is provided as shown for setting the internal bag or bladder pressure of the array of cushion bodies carried by movable upright frame members 17.

The leg-hold cushion bodies 144 are similarly served from high-pressure trunk line 202, via shut-off valves 210. The cushion pressure vessels 145 associated with the forelegs from one unitarily-controlled group and are depicted at the lower portion of the diagram, while the cushion bodies associated with the hind legs are also controlled as a separate group, each group comprising four pressure vessels. A reserve storage chamber 211 is provided as near as possible to each group of leg-hold cushion bodies in installations where the highest rate of filling of their internal spaces is to be achieved, hence chambers 211 may comprise the interior spaces of the upright pair of frames on which the support plates 146 are mounted. Alternatively, a reserve chamber may be formed utilising part of each support plate as one bounding wall and extending (not shown) between the upright members. Where each leg-hold structure 144 has a maximum internal volume when distended of 80 liters or more, the reserve chamber volume should be of the order of half of the combined volume of the four pressure vessels 145, i.e. at least 40 liters of chamber space in each side frame.

Figure 16:
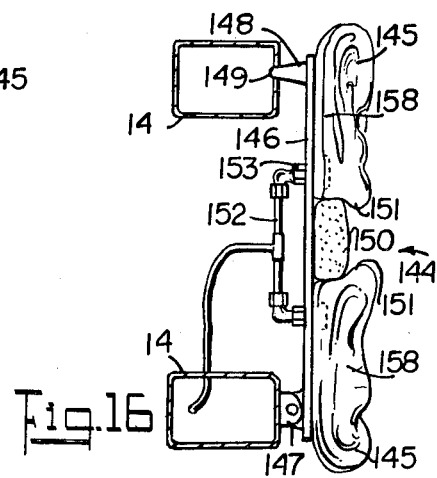
FIG. 16 is a partial horizontal section of the leg-hold of FIG. 15 shown in top plan view in deflated state.
Figure 17:
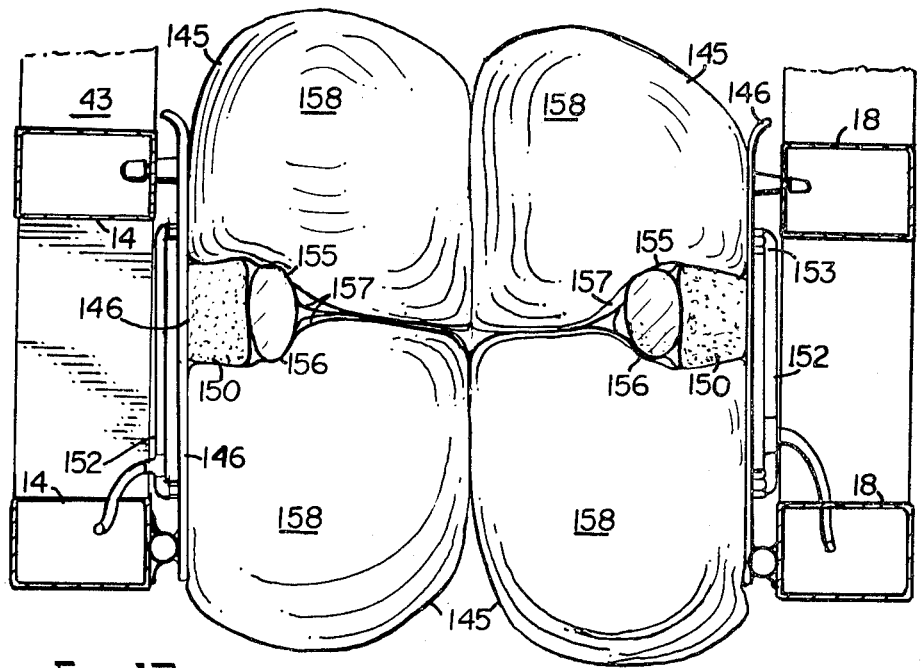
FIG. 17 is a horizontal section taken on line 17—17 of FIG. 14 showing leg-hold engagement with an animal's forelegs.

The high-pressure air in chamber 211 is led via conduit 212 to a three-position valve 213, which in one limit position as illustrated extends the flow path from chamber 211 to the conduits 152 described with reference to FIG. 16, admitting air rapidly to cause expansion of the pressure vessels 145. The valve 213 may be moved to a second position to isolate the cushion body group from the chamber 211, or it may be moved to a third limit position at which a flow path is completed from pressure vessels 145 via conduits 152 and a sub-atmospheric container 214 via conduit 215 to deflate the leg-hold cushion body group rapidly and to cause external atmospheric pressure to collapse the bags against their support plates 146.

Alternatively, valve 213 may be connected in the pneumatic circuit ahead of reserve chamber 211 so that this chamber and the internal volumes of pressure vessels 145 may be isolated jointly, thereby stabilising leg-hold pressure despite any deformation caused by animal leg movement.

The sub-atmospheric air supply system comprises a drive motor $M_3$ driving evacuating pump 216 functioning to withdraw air through a shut-off valve 217 from main vacuum vessel 218. The reduction of pressure below atmospheric is visually indicated for example as absolute pressure reading in cm of mercury by gauge 219. The vacuum trunk line 220 leading from vessel 218 communicates with reserve sub-atmospheric container 214 located closely adjacent each group of leg-hold bodies 144 and ideally comprise a substantial internal volume of the vise framework, particularly of top-wall members 16. Auxiliary chambers (not shown) may also be provided.

It is intended here by the expression "vacuum" to denote sub-atmospheric pressure rather than a highly rarefied state; nevertheless, systems capable of achieving absolute pressures as low as 10 cm of Hg in containers 214 are advantageous where very rapid release of an animal's legs is to be effected with complete collapse of the side walls 151 and end walls 158 to form an open chute.

ANIMAL HANDLING PROCEDURES

In the foregoing description a number of preferred embodiments of animal handling equipments have been discussed, adaptable for immobilizing animals of a wide range of body sizes and body forms, either as permanent installations in an animal surgical hospital or clinic, or as transportable units capable of being towed or driven to field or range locations, particularly where numbers of animals are to be treated in succession with least possible trauma.

Embodiments which are constructed to be as light as possible consistent with safe restraint of large animals may be suspended from helicopters or cranes and are particularly suitable for transport to and from sites otherwise inaccessible by conventional trucks or water craft.

In one version, a vise unit of the type illustrated in FIG. 11 may be interposed as an extension of a conventional animal chute or passage in a building or corral, through which the animal walks and is stopped along the passage or chute and is immobilized in the vise framework by inflating the leg-hold cushion bodies rapidly and by constricting the vise side walls, after which the vise unit may be raised and the animal transported in upright suspended state to another location.

In an animal is so ill or weak that it is essentially immobile and is lying on the ground on its side, the vise framework is set on the ground with its rigid side wall 11 in the horizontal plane in longitudinal parallel alignment with the length of the animal. The animal may then be lifted by passing straps between its body and the ground, joining the ends of the straps to a part of the columnar portions 18 and folding the frame members 17 to swing portions 18 into inclined positions, thereby moving the animal more nearly directly over the upwardly-facing array of cushion bodies. The reverse rotation of the columnar portions while exerting force to position the animal on the cushion bodies under it effects the desired placing of the animal body, after which the vise walls are constricted in the usual manner, the leg-holds fitted and inflated, and the animal transported to a place of treatment.

Immobilizing transportable vise units according to the invention have utility also in wildlife protection services for treatment and inspection of animals such as bears, moose, deer, elk, muskox and other quadrupeds, which services may include routine examination of living animals, or autopsies. Treatment may comprise wound suturing and sterilization; disease control by inoculation; tranquilised control and studies of infestation; and many other research activities on animals in alive state, formerly carried out laid sacrificed animals. Handling procedures will generally comprise first tranquilizing the animal, when transporting it when necessary within a vise unit to a station, with complete safety to the animal and human personnel, by the procedure outlined earlier. The animal may be kept in a restricted enclosure for longer periods for observation and then immobilized in a chute or passage installed as has been described, prior to returning it to its habitat. When the immobilized and traquilised animal is examined in the field and may yet be sedated and not yet mobile, the framework is alid on its side as in FIG. 11 and the animal rolled off or lifted off by raising its body by means of slings secured to the outer ends of the columnar portions 18, employing the frame holding procedure as described previously. The framework is withdrawn to leave the animal to recover and depart when mobile again. If the animal has recovered prior to its release, the release procedure is carried out with the animal's feet toughing ground and its body in standing position, and the animal encouraged to leave the vise.

It is to be understood that while certain specific structures have been described in detail for purposes of teaching the practice of the invention with reference to some of its practical embodiments, the invention is by no means intended to be limited to identical structures or structures merely altered in dimensions or proportions but extends to all immobilizing vise-form structures providing a pair of relatively transversely movable side walls, and particularly to such vise-form structures in which the side walls carry arrays of body-gripping surfaces that may be caused to be relatively transversely movable by internal inflation, by mechanical wall movement or both. The invention extends to such vise-form structures wherein body-gripping surfaces line the interior side walls and are adapted to support an animal body wholly by engagement of some or all of the body-gripping surfaces with the animal body and are adapted to conform to the shape of the body of the animal when the vise side walls are constricted. The invention extends also to all means for controllably rotating the vise framework while holding an animal therein about sets of axes which are orthogonally related. The invention further embraces the concept in and all chute-like structures functioning with no bottom wall or floor, that may be lowered about the animal body from above, or through which the animal may walk freely as in a passage, or into the open vise structure of which the animal body may be placed through an open lower side and/or an opened side wall.

The invention is accordingly to be defined and limited solely by interpretation of the accompanying claims in the light of the foregoing description and with reference to the disclosures of the accompanying drawings.

We claim:

1. Animal immobilizing clamp apparatus comprising an elongate open three-sided framework of inverted "U" cross-sectional form comprising a top-wall frame and opposed side-wall frames of length and height sufficient to confine the sides of an animal to be immobilized, said framework having open ends and bottom, one side-wall frame comprising a rigid planar structure integrally joined with said top-wall frame, the other side-wall frame comprising a series of columns spaced apart horizontally and extending downwardly from said top wall frame, a first plurality of cushioned plate elements mounted on the inner side of each column, and a second plurality of cushioned plate elements mounted on the inner side of said rigid side-wall frame, means mounting said columns in said top-wall frame for independent guided rectilinear movement of a column toward and away from said rigid side-wall frame, means for controllably moving each column to vary the spacings between opposed plate elements for clampedly engaging opposite sides of an animal and for releasing the animal, and means for connecting said apparatus is supported relation with a reference structure.

2. Animal immobilizing apparatus as set forth in claim 1 wherein said top-wall frame comprises beam members extending perpendicularly from said rigid side-wall frame and said columns are carried by slide elements reciprocably movable along the length dimension of said top-wall beam members.

3. Animal immobilizing apparatus as set forth in claim 2 wherein said cushioned plate elements support distensible cushion bodies on their inwardly-facing surfaces, and said apparatus comprises means to selectably inflate or deflate said bodies.

4. Animal immobilizing apparatus as set forth in claim 2 wherein said reference structure comprises a floor and said means for connecting said apparatus in supported relation therewith comprise at least three floor-mounted hydraulic piston-and-cylinder linear motor means, at least two of said motor means being pivotedly connected with said rigid side-wall frame at longitudinally-spaced lower positions and being aligned in upright or nearly upright attitude, and a third linear motor means being pivotedly connected with said rigid side-wall frame at a position intermediate upper and lower margins of said rigid side-wall frame and being inclined with respect to the floor.

5. Animal immobilizing apparatus as set forth in claim 2 wherein said reference structure is floor or ground and said means for connecting said apparatus in supported relation therewith comprise a gantry crane or like elevating apparatus and a suspension link connected with an eye or ring carried by said top-wall frame.

6. Animal immobilizing apparatus as set forth in claim 3 wherein said cushioned plate elements are generally rectangular and have areal dimensions such that margins of adjacent plates are closely spaced, and said plates are mounted by universal pivot means for limited angular deflection about longitudinal and vertical axes in said pivot means.

7. Animal immobilizing apparatus as set forth in claim 3 wherein said plates of said first and second pluralities are mounted in opposed pairs.

8. Animal immobilizing apparatus, comprising opposed elongate side-wall frames and a top-wall defining a three-sided animal-receiving framework having open ends and bottom, one side-wall frame comprising a rigid braced group of longitudinally spaced upright beam members having a height at least as high as the largest animal to be confined integrally joined with longitudinal bracing beam members, said top-wall frame comprising a plurality of transverse beam members, said upright beam members being integrally joined at their upper ends with the adjacent ends of corresponding transverse beam members, respectively, guide means carried by each transverse beam member, the other side-wall frame comprising an equal group of longitudinally-spaced upright cantilever beam members, each cantilever beam member carrying integral slide means mounted on a respective guide means for independent guided reciprocatory movement along said guide means toward and away from said rigid side-wall frame, animal clamping means comprising a plurality of plate elements mounted on the inner sides of said side-wall frames in closely adjacent spaced relation and distributed over substantially the entire inner areas thereof as at least two tiers having combined vertical span sufficient to cover the side of an animal, said plate elements each supporting a cushion body, powered motive means connected with said top-wall frame and with cantilever beam member for moving each cantilever beam member independently along associated guide means, control means for actuating said motive means for clampedly engaging the sides of an animal received between opposed tiers of cushion bodies and for disengaging from said animal, and means connecting said clamp apparatus for support by a reference structure.

9. Animal immobilizing clamp apparatus as set forth in claim 8 wherein said cushion bodies comprise a pneumatically-distensible elastomeric sac having conduit means connected for supply thereto of air at selected pressure to inflate or deflate said cushion body.

10. Animal immobilizing clamp apparatus as set forth in claim 9 wherein said reference structure is a gantry crane or like lifting apparatus and said top-wall frame carries connection means for attachment of a link for suspending said animal-receiving framework with said side-wall frames in upright attitude.

11. Animal immobilizing clamp apparatus as set forth in claim 9 wherein said reference structure is a building floor and said means connecting said clamp apparatus for support comprise sub-floor mounted upright hydraulic piston-and-cylinder motor means and said rigid side-wall frame carries connector means pivotedly mounted at longitudinally spaced positions along the lower margin of said side-wall frame and connected with respective piston elements, and a floor-mounted inclined hydraulic piston-and-cylinder motor means and said rigid side-wall frame carries connector means pivotedly mounted in said frame intermediate said top-wall frame and said lower margin and connected with the piston element of said inclined motor means, and wherein means are provided for controllably extending and retracting the pistons of each of said motor means.

12. Animal immobilizing clamp apparatus as set forth in claim 8 wherein said cushion bodies are supported on associated plate elements by fabric covers, said covers having integral marginal portions folded over edges of the plate elements and the folded-over portions are joined to prevent lateral movement of the sac and cover with respect to the plate while permitting sac distention.

13. Animal immobilizing clamp apparatus as set forth in claim 12 wherein said plate elements are arranged as opposed pairs.

14. Animal immobilizing clamp apparatus as set forth in claim 8 wherein said reference structure is a wall of an animal-guiding passage of which the clamp apparatus forms a portion of the length thereof.

15. Animal immobilizing clamp apparatus as set forth in claim 8 wherein each cantilever beam member comprises a minor length portion integral with said slide means and a major length portion hingedly mounted for rotation with respect to said minor length portion between a position in which said length portions are aligned in end-to-end abutting relationship and an outwardly-rotated position in which said major length portion is disposed generally at right angles to the minor length portion, and means to selectably join said length portions when in their aligned relation to obtain unitary rectilinear movement of the cantilever beam member by said powered motive means and to release said major length portion for outward rotation.

16. Animal immobilizing clamp apparatus as set forth in claim 15 wherein said means for selectably holding said length portions in alignment comprises hinge means spanning the junction of said length portions and connected to outward surfaces of said length portions in joining relation for enabling their relative rotation about an axis in the hinge means transverse to the length of the cantilever beam member, and comprises releasable securing means carried by said length portions having respective engaging elements mounted in inwardly spaced relation from said hinge axis and being disconnectably connectible to render said length portions unitary or freely rotatable relative to each other.

17. Animal immobilizing clamp apparatus as set forth in claim 16 wherein said releasable securing means comprise a spring-biased latch bar having a pivot receiving end and an integral hook end, pivot means carried in said major length portion mounting said latch bar by said pivot-receiving end to extend said hook end beyond said junction, catch means carried in said minor length portion for lockingly engaging said latch bar hook when said length portions are in aligned abutting relation, and spring bias means associated with said pivot means urging said hook end to maintain locking engagement with said catch means.

18. Animal immoblizing clamp apparatus as set forth in claim 17 comprising actuator means accessible adjacent the free end of the cantilever beam member effective to selectably release said latch bar from said catch means and to permit said spring bias means to effect locking engagement.

19. Animal immobilizing clamp apparatus as set forth in claim 15 wherein said major length portion of a cantilever beam member carries a bracket spaced below said junction and fixed to the outward side of said length portion, and the transverse beam member which carries the slide carries a bracket secured on its free end, and wherein said means to selectably join said length portions comprises a compression link having telescopingly engaged elements, each element having a bracket-engaging end having a pivot-receiving aperture, means effective to selectably lock said link elements to prevent their relative movement and to selectably unlock said link elements to render said link elements freely relatively movable for length extension and length reduction, means pivotedly connecting said bracket-engaging ends of said link elements with respective brackets whereby when said powered motive means are actuated to move a cantilever beam member from an outward toward an inward position relative to said rigid sidewall frame and said link members are locked said major length portion is rotated outwardly about said hinged mounting, and when said slide is moved outwardly said major length portion is returned to aligned abutting relation with respect to said minor length portion.

20. Animal immobilizing clamp apparatus, comprising an elongate three-sided vise framework consisting of opposed spaced-apart side walls and a top wall, said framework being open at its ends and bottom, a plurality of yielding surfaces, along the inner sides of said opposed side walls, and means including inflatable pneumatic bladders for selectably displacing at least some of said yielding surfaces toward each other, said bladders having flexible walls carrying said surfaces, said walls being distensible toward the opposed side wall when inflated to grip the sides of an animal body therebetween, said universal swivel means being operable to swivel said surfaces into generally tangential engagement with the surfaces of the animal body and to support the weight of said body.

21. Animal immobilizing clamp apparatus as set forth in claim 20 wherein said means to displace said yielding surfaces comprise means for moving members of one side wall toward and away from the other side wall.

22. Animal immobilizing clamp apparatus as set forth in claim 21 wherein said apparatus is mounted on a reference structure by at least three spaced movable links, said links having their one ends fixed in said reference structure and having their other ends fixed in one side wall of said apparatus, and said links are adjustable in length to selectably incline said apparatus by rotation of said side wall about a first axis aligned with the length dimension of the apparatus and/or about a second axis aligned with the transverse dimension of said apparatus.

23. Animal immobilizing clamp apparatus as set forth in claim 22 wherein said links comprise fluid-actuated hydraulic motors, two of said motors being mounted in upright attitude and being connected by their upper ends with a lower marginal portion of said one side wall and the third motor being mounted in inclined attitude and being connected with said one side wall intermediate the lower and upper margins thereof.

* * * * *